(12) United States Patent
Yamamoto et al.

(10) Patent No.: US 7,736,548 B2
(45) Date of Patent: Jun. 15, 2010

(54) NON-LINEAR OPTICAL DEVICE WITH LONG GRATING PERSISTENCY

(75) Inventors: Michiharu Yamamoto, Carlsbad, CA (US); Peng Wang, San Diego, CA (US)

(73) Assignee: Nitto Denko Corporation, Osaka (JP)

( * ) Notice: Subject to any disclaimer, the term of this patent is extended or adjusted under 35 U.S.C. 154(b) by 104 days.

(21) Appl. No.: 11/781,508

(22) Filed: Jul. 23, 2007

(65) Prior Publication Data

US 2008/0039603 A1    Feb. 14, 2008

Related U.S. Application Data

(60) Provisional application No. 60/833,429, filed on Jul. 25, 2006.

(51) Int. Cl.
    *G02B 5/30* (2006.01)
(52) U.S. Cl. .............. 252/589; 252/583; 252/584; 252/585; 252/586; 252/587; 252/588; 525/185; 526/298; 526/317.1; 526/318; 526/319; 526/326; 526/328.5; 526/937
(58) Field of Classification Search ............... 526/257, 526/258, 259, 260, 263, 266, 270, 284, 288, 526/298, 317.1, 318, 319, 326, 328.5, 937
See application file for complete search history.

(56) References Cited

U.S. PATENT DOCUMENTS

| | | | |
|---|---|---|---|
| 2,774,697 A | 12/1956 | Koblitz | |
| 3,658,526 A | 4/1972 | Haugh | |
| 4,588,664 A | 5/1986 | Fielding et al. | |
| 4,696,876 A | 9/1987 | Cael | |
| 4,942,112 A | 7/1990 | Monroe et al. | |
| 4,959,284 A | 9/1990 | Smothers et al. | |
| 4,970,129 A | 11/1990 | Ingwall et al. | |
| 4,994,347 A | 2/1991 | Smothers | |
| 5,064,264 A | 11/1991 | Ducharme et al. | |
| 5,314,939 A | 5/1994 | Lebarny et al. | |
| 5,422,873 A * | 6/1995 | Kewitsch et al. | ............ 369/103 |
| 5,451,514 A | 9/1995 | Boudet et al. | |
| 5,680,212 A | 10/1997 | Blouin et al. | |
| 5,724,460 A | 3/1998 | Hayden et al. | |
| 5,744,267 A | 4/1998 | Meerholz et al. | |
| 5,763,548 A | 6/1998 | Matyjaszewski et al. | |

(Continued)

FOREIGN PATENT DOCUMENTS

EP    0 084 452 A    7/1983

(Continued)

OTHER PUBLICATIONS

English Translation of JP 7-318992, Hari et al., Dec. 1995.*

(Continued)

*Primary Examiner*—Vasu Jagannathan
*Assistant Examiner*—Robert C Boyle
(74) *Attorney, Agent, or Firm*—Knobbe Martens Olson & Bear LLP

(57) ABSTRACT

A non-linear optical device comprising a polymer configured to provide a grating holding ratio of 20% or higher after about four minutes, wherein the polymer comprises a first repeating unit comprising a first moiety having formula (M-1) and a second repeating unit comprising a second moiety having formula (M-2), as defined herein.

12 Claims, 1 Drawing Sheet

U.S. PATENT DOCUMENTS

| | | | |
|---|---|---|---|
| 5,807,937 | A | 9/1998 | Matyjaszewski et al. |
| 5,981,837 | A | 11/1999 | Chapple |
| 6,049,402 | A | 4/2000 | Burr |
| 6,090,332 | A | 7/2000 | Marder et al. |
| 6,211,976 | B1 | 4/2001 | Popvich et al. |
| 6,267,913 | B1 | 7/2001 | Marder et al. |
| 6,376,655 | B1 | 4/2002 | Berg et al. |
| 6,534,198 | B1 | 3/2003 | Mashimo et al. |
| 6,610,809 | B1 | 8/2003 | Yamamoto et al. |
| 6,653,421 | B1 * | 11/2003 | Yamamoto et al. .......... 526/259 |
| 6,809,156 | B2 | 10/2004 | Yamamoto |
| 7,186,781 | B2 | 3/2007 | Yamamoto |
| 2002/0191236 | A1 | 12/2002 | King |
| 2003/0181240 | A1 | 9/2003 | Nagao |
| 2004/0043301 | A1 | 3/2004 | Hirao et al. |
| 2004/0077794 | A1 | 4/2004 | Yamamoto |
| 2004/0200999 | A1 | 10/2004 | Cammack et al. |
| 2004/0265740 | A1 | 12/2004 | Yamamoto |
| 2005/0051758 | A1 | 3/2005 | Yamamoto et al. |
| 2005/0116209 | A1 | 6/2005 | Yamamoto et al. |
| 2005/0233246 | A1 | 10/2005 | Boden et al. |
| 2006/0235163 | A1 | 10/2006 | Yamamoto et al. |
| 2009/0052009 | A1 | 2/2009 | Yamamoto et al. |
| 2009/0092746 | A1 | 4/2009 | Gu et al. |
| 2009/0197186 | A1 | 8/2009 | Gu et al. |

FOREIGN PATENT DOCUMENTS

| | | |
|---|---|---|
| EP | 0 514 786 A | 11/1992 |
| JP | 04 014083 A | 1/1992 |
| JP | 7-318992 * | 12/1995 |
| JP | 2001-115124 | 4/2001 |
| JP | 2001-337585 | 12/2001 |
| WO | WO 97/23599 | 7/1997 |
| WO | WO 98/11205 | 3/1998 |
| WO | WO 2008/013774 A | 1/2008 |
| WO | WO 2008/013775 A | 1/2008 |

OTHER PUBLICATIONS

Database WPI Week 199910, Derwent Publications Ltd., London, GB; An 1999-110160, XP002466177 & JP 10 333195 A (SHOWA DENKO KK) Dec. 18, 1998.

Database WPI Week 199607, Derwent Publications Ltd., London, GB; An 1996-062143, XP002466178 & JP 07 318992 A (HITACHI LTD.) Dec. 8, 1995.

Jayan Thomas et al., "*Bisarylamine polymer-based composites for photorefractive applications*" Advanced Materials, vol. 16, No. 22, 2004, pp. 2032-2036, XP008087877.

International Search Report and the Written Opinion issued in the PCT/US2007/016569.

The Office Action issued in the U.S. Appl. No. 11/781,633.

Yiping Cui et al., "*Photorefractivvity in a Novel Polymer Composite with High Diffraction Efficiency and Broad Optical Transparency*" J. Phys. Chem. B, [Online], vol. 101, Apr. 15, 1997, pp. 3530-3534.

Peng Wang et al., "*Novel Full-color Photorefractive Polymer for Photonics Applications*,"CLEO '07. 2007 Conference on Lasers and Electro-Optics May 5-11, 2007, Baltimore, MD, pp. 1-2.

O. Ostroverkhova, et al., "Organic Photorefractives: Mechanisms, Materials, and Applications," Chem. Rev., [Online], vol. 104, Jun. 26, 2004, pp. 3267-3313.

Ando et al., 1996, Living Radical Polymerization of Methyl Methacrylate with Ruthenium Complex: Formation of Polymers with Controlled Molecular Weights and Very Narrow Distributions, Macromolcules, 29(3):1070-1072.

Atanassova et al., 1995, Altered lignin composition in transgenic tobacco expressing .omicron.-methyltransferase sequences in sense and antisense orientation, The Plant Journal, 8(4):465-477.

Baucher et al., 1996, Red Xylem and Higher Lignin Extractability by Down-Regulating a Cinnamyl Alcohol Dehydrogenase in Poplar, Plant Physiol. 112:1479-1490.

Bell-Lelong et al., 1997, Cinnamate-4-Hydroxylase Expression in Arabidopsis, Plant Physiol. 113:729-738.

Blanchard-Desce et al., 1997, Large Quadratic Hyperpolarizabilities With Donor—Acceptor Polyenes Exhibiting Optimum Bond Length Alternation: Correlation Between Structure And Hyper Poloarizability, Chem. Eur. J., 3(7):1091-1104.

Boudet et al., 1996, Lignin Genetic Engineering, Molecular Breeding, NL, Kluwer Academic Publishers, Dordrecht, 2:25-39.

Brust et. al., 1994, Synthesis of thiol-derivatised gold nanoparticles in a two-phase Liquid-Liquid system, *Journal of the Chemical Society, Chemical Communications*, p. 801.

Campbell et al., 1996, Variation in Lignin Content and Composition, Plant Physiol. 110:3-13.

Chapple et al., Nov. 1992, An Arabidopsis Mutant Defective in the General Phenylpropanoid Pathway, The Plant Cell, 4:1413-1424.

Chapple, 1995, An cDNA Encoding a Novel Cytochrome P450-Dependent Monooxygenase from Arabidopsis thaliana, Plant Physiol., 108:875-876.

Chemla et al., Nonlinear Optical Properties of Organic Molecules and Crystals (Academic Press, 1987).

Chen et al. Photorefractive effect in a New Bi-Functional Host Polyer Based Composite, Journal of Modern Optics, 1999, 46, 1003-1010.

Chen et al., 2000, Photorefractive Effect in a New Composite Based on Bi-functional Host Polymer, Journal of Applied Polymer Science, 77:189-194.

Choudhruy et al., 2005, Hybrid Quantum-Dot-Polymer Nanocomposites for Infrared Photorefractivity at an Optical Communication Wavelength, Adv. Mater., 17:2877-2881.

Daniel et al., 2004, Gold nanoparticles: Assembly, Supramolecular Chemistry, Quantum-Size-Related Properties, and Applications toward Biology, Catalysis, and Nanotechnology, Chemical Reviews, 104(1):293-346.

Diaz-Garcia et al., 1999, Photorefractive Properties of Poly(N-vinyl carbazole)-Based Composites for High Speed Applications, Chem. Mater., 11(7):1784-1791.

Douglas, Jun. 1996, Phenylpropanoid metabolism and lignin biosynthesis: from weeds to trees, Trends in Plant Science, 1(6):171-178.

Dwivedi et al., 1994, Modification of lignin biosynthesis in transgenic Nicotiana through expression of an antisense .omicron.-methyltransferase gene from Populus, Plant Molecular Biology, 26:61-71.

Elango et al., Jan. 2005, Relationship between electrophilicity index, Hammett constant and nucleus-independent chemical shift, J. Chem. Sci., 117(1):61-65.

Eralp et al., Aug. 2004, High-performance photorefractive polymer operating at 975 nm, J. Thomas Appl. Phys. Lett., 85:1095-1097.

Ewert et al., 1998, Polyurethanes and polyesters for photorefractive applications, Proceedings of SPIE 3471:134-141.

Farmer et al., Jun. 28, 2001, Synthesis of electroluminescent organic/inorganic polymer nanocomposites, Polymer Preprints, 42(1):578-579.

Goffner et al, 1992, Purification and characterization of isoforms of cinnamyl alcohol dehydrogenase from Eucalyptus xylem, Planta (Springer-Verlag) 188:48-53.

Gong et al., 1999, Suitable alkoxy chain attached to azo dye nonlinear optical chromophore in low Tg photorefractive polymeric composites, Proceedings of the International Conference on Lasers, 21st, 764-769, Abstract.

Grand, Apr. 9, 1984, Ferulic acid 5-hydroxylase: a new cytochrome P-450-dependent enzyme from higher plant microsomes involved in lignin synthesis, FEBS Letters, 169(1):7-11.

Gu et al., Energy Transfer from a Surface-Bound Arene to the Gold Core in ω-Fluorenyl-Alkane-1Thiolate Monolayer-protected Gold Clusters, *Chem. Mater* 2003, 15, 1358-1366.

Halpin et al., 1994, Manipulation of lignin quality by downregulation of cinnamyl alcohol dehydrogenase, *The Plant Journal*, 6(3):339-350.

Hattemer et al., 2000, Poly(4-diphenyl-aminostyrenes): new polymers for electrooptics, Polymer Preprints, 41(1):785-786.

Hendrickx et al., 2000, Photorefractive properties of TNFM-sensitized PVK-based polymer composites and fully functionalized polymethacrylates, Proceedings of SPIE, 4104:130-139.

Hendrickx et al., 2001, Photorefractive properties and applications of polymer composites and fully functionalized polymethacrylates, Materials Science and Engineering C, 18(1-2):25-35.

Hendrickx et al., Photoconductive properties of PVK-based photorefractive polymer composites doped with fluorinated styrene chromophores, J. Mater. Chem., 1999, 9, 2251-2258.

Hostetler et al., Infrared Spectroscopy of Three-Dimensional Self-Assembled Monolayers: N-Monolayers on Gold Cluster Compounds, *Langmuir* 1996, vol. 12, 3604-3612.

Jahng et al., 2002, Synthesis and Characterization of Hole-transport Materials in Polysiloxane, Molecular Crystals and Liquid Crystals, 377:329-332.

Kawakami, et al., May 3, 1993, Photoinduced refractive index change in a photoconductive electro-optic polymer, Appl. Phys. Lett, 62(18):2167-2169.

Lacombe et al., 1997, Cinnamoyl CoA reductase, the first committed enzyme of the lignin branch biosynthetic pathway: cloning, expression and phylogenetic relationships, The Plant Journal, 11(3):429-441.

Lee et al., 1997, A new class of poly(1,6-heptadiyne)-based photorefractive materials by metathesis polymerization, Polymeric Materials Science and Engineering 76:314-315.

Mecher et al., Aug. 2002, Near-infrared sensitivity enhancement of photorefractive polymer composites by pre-illumination, Nature Publishing Group, 418:959-964.

Meerholz et al., Oct. 6, 1994, A photorefractive polymer with high optical gain and diffraction efficiency near 100%, Nature, 371:497-500.

Meyer et al., Jul. 1996, Ferulate-5-hydroxylase from Arabidopsis thaliana defines a new family of cytochrome P450-dependent monoooxygenases, Proc. Natl. Acad. Sci. USA, 93:6869-6874.

Moon, et al., 2000, Highly Efficient Photoretractive System Based on Carbazole-Substituted Poly (Siloxane), Mol. Cryst. Liq. Cryst., 349:43-46.

Ni et al., 1994, Reduced lignin in transgenic plants containing a caffeic acid .omicron.-methyltransferase antisense gene, Transgenic Research 3:120-126.

Odian, Principles of Polymerization, John Wiley, New York, $2^{nd}$ Ed., 1981, pp. 7-10.

Osakabe et al., 1995, Structure and Tissue-Specific Expression of Genes for Phenylalanine Ammonia-lyase From a Hybrid Aspen, Populus Kitakamiensis, Plant Science (Limerick), 105(2):217-226.

Park et al., 2000, Synthesis and Charactization of photorefractive polymers with triphenylamine unit and NLO chromophore unit on a side chain, Polymers for Advanced Technologies, 11(7):349-358.

Parr et al., 1999, Electrophilicity Index, J. Am. Chem. Soc., 121:1922-1924.

Patten et al., Radical polymerization yielding polymers with Mw/Mn ~1.05 by homogeneous atom transfer radical polymerization, Polymer Preprints, 1996, 37:575-576.

Sato et al., Oct. 1995, Synthesis and Characterization of Photorefractive Polymeric Material with high Charge Mobility, Technical Report of IEICB, pp. 43-45.

Shiokawa et al., Sep. 23, 1996, Expression Analysis of a 1-16 Cinnamic Acid 4-Hydroxylase Gene from a Hybrid Aspen, Populus Kitakamiensis, Chemical Abstracts and Indexes, US, American Chemical Society, Columbus, 13(125).

Tamura, et al., Apr. 13, 1992, New polymeric material containing the tricyanovinylcarbazole group for photorefractive applications, Appl. Phys. Lett. 60(15):1803-1805.

Tay et al., Nov. 15, 2004, Photorefractive polymer composite operating at the optical communication wavelength of 1550 nm, Appl. Phys. Lett., 85(20):4561-4563.

Tay et al., Oct. 2005, High-performance photorefractive polymer operating at 1550 nm with near-video-rate response time, Appl. Phys. Lett., 87:171105.

Templeton et al., 2000, Monolayer-Protected Cluster Molecules, Accounts of Chemical Research, 33(1):27-36.

Twleg, et al., 1996, Recent Progress on Photorefractive Chromophores and polymers, IBM Research Division Almaden Research Laboratory, San Jose, CA 95120, pp. 164-165.

Van Doorsselaere et al., 1995, A novel lignin in poplar trees with a reduced caffeic acid/5-hydroxyferulic acid .omicron.-methyltransferase activity, The Plant Journal, 8:855-864.

Van Steenwinckel, et al., Fully Functionalized Photorefractive Polymethacrylates with net Gain at 780 nm, Macromolecules, vol. 33, No. 11, 2000, pp. 4074-4079.

Walkup et al., Synthesis of Sterically 1-Arylpyrrolidines and 1-Arylpiperidines by Condensation of Primary Aromatic Amines with Cyclic Ethers of Diols, Hindered Jan. 1985, Tetrahedron, 41:101-106.

Wang et al., 1999, Image storage and real-time distorted image correction by using photorefractivity in a stable photorefractive polymer composite, Chinese Physics Letters, 16(6):420-422.

Wang, et al., 1995, Controlled/"Living" Radical Polymerization. Halogen Atom Transfer Radical Polymerization Promoted by a Cu(I)/Cu(II) Redox Process, Macromolecules, 28(23):7901-7910.

Wright, et al., Photorefractive Properties of Poly (siloxane)-triarylamine-Based Composites for High-Speed Applications, J. Phys. Chem. B, May 22 2003, 107(20):4732-4737.

Zhao et al., 1995, Photorefractive polymer with side-chain second-order nonlinear optical and charge-transporting groups, Chem. Mater. 7(6):1237-42.

Zhou et al, Feb, 25, 2000, Synthesis of $C_{60}$-End-Bonded Polymers with Designed Molecular Weights and narrow Molecular Weight Distributions via Atom Transfer Radical Polymerization, Macromolecules 2000, 33:1948-1954, American Chemical Society Published on Web.

* cited by examiner

NON-LINEAR OPTICAL DEVICE WITH LONG GRATING PERSISTENCY

This application claims priority to U.S. Provisional Application No. 60/833,429, entitled "NON-LINEAR OPTICAL DEVICE WITH LONG GRATING PERSISTENCY," filed on Jul. 25, 2006, the contents of which are incorporated herein by reference in their entirety.

This application is related to and incorporates by reference in its entirety U.S. patent application Ser. No. 11/781,633 to Yamamoto, entitled "NON-LINEAR OPTICAL DEVICE SENSITIVE TO GREEN LASER," filed concurrently herewith on Jul. 23, 2007.

BACKGROUND OF THE INVENTION

1. Field of the Invention

This invention relates to a non-linear optical device comprising a polymer configured to having long grating holding ratio. More particularly, the polymer comprises at least one repeating unit that comprises a carbazole moiety and at least one repeating unit that comprises a tetraphenyl diaminobiphenyl moiety.

2. Description of the Related Art

Photorefractivity is a phenomenon in which the refractive index of a material can be altered by changing the electric field within the material, such as by laser beam irradiation. The change of the refractive index typically involves: (1) charge generation by laser irradiation, (2) charge transport, resulting in the separation of positive and negative charges, (3) trapping of one type of charge (charge delocalization), (4) formation of a non-uniform internal electric field (space-charge field) as a result of charge delocalization and (5) a refractive index change induced by the non-uniform electric field. Good photorefractive properties are typically observed in materials that combine good charge generation, charge transport or photoconductivity and electro-optical activity. Photorefractive materials have many promising applications, such as high-density optical data storage, dynamic holography, optical image processing, phase conjugated mirrors, optical computing, parallel optical logic, and pattern recognition. Particularly, long grating holding ratio can contribute significantly for high-density optical data storage or holographic display applications.

Originally, the photorefractive effect was found in a variety of inorganic electro-optical (EO) crystals, such as LiNbO$_3$. In these materials, the mechanism of a refractive index modulation by the internal space-charge field is based on a linear electro-optical effect.

In 1990 and 1991, the first organic photorefractive crystal and polymeric photorefractive materials were discovered and reported. Such materials are disclosed, for example, in U.S. Pat. No. 5,064,264. Organic photorefractive materials offer many advantages over the original inorganic photorefractive crystals, such as large optical nonlinearities, low dielectric constants, low cost, lightweight, structural flexibility, and ease of device fabrication. Other important characteristics that may be desirable depending on the application include sufficiently long shelf life, optical quality, and thermal stability. These kinds of active organic polymers are emerging as key materials for advanced information and telecommunication technology.

In recent years, efforts have been made to enhance the properties of organic, and particularly polymeric, photorefractive materials. Various studies have been done to examine the selection and combination of the components that give rise to each of these features. The photoconductive capability is frequently provided by incorporating materials containing carbazole groups. Phenyl amine groups can also be used for the charge transport part of the material.

Non-linear optical ability is generally provided by including chromophore compounds, such as an azo-type dye that can absorb photon radiation. The chromophore may also provide adequate charge generation. Alternatively, a material known as a sensitizer may be added to provide or boost the mobile charge for photorefractivity to occur.

The photorefractive composition may be made by mixing molecular components that provide desirable individual properties into a host polymer matrix. However, most of previously prepared compositions failed to show good photorefractivity performances, (e.g., high diffraction efficiency, fast response time and long-term stability). Efforts have been made, therefore, to provide compositions which show high diffraction efficiency, fast response time and long stability.

U.S. Pat. Nos. 6,653,421 B1 and 6,610,809 B1 disclose (meth)acrylate-based polymers and copolymer based materials which showed high diffraction efficiency, fast response time, and long-term phase stability. The materials show fast response times of less than 30 msec and diffraction efficiency of higher than 50%, along with no phase separation for at least two or three months.

None of the materials described above achieves the desired combination of high diffraction efficiency with a fast response time and long-term stability, along with long grating holding ratio. A material with long grating holding ratio possesses the ability to exhibit grating signal behavior after several minutes of irradiation. Optical devices with these properties are useful for various applications, such as data or image storage. Thus, there remains a need for optical devices comprising materials that combine good photorefractivity performances with long grating holding ratio.

SUMMARY OF THE INVENTION

It is one object of several embodiments of the present invention to provide a photorefractive composition which exhibits fast response time and high diffraction efficiency, along with long diffractive grating lasting time and phase stability.

An embodiment provides a non-linear optical device comprising a polymer configured to provide a grating holding ratio of 20% or higher after about four minutes, wherein the polymer comprises a first repeating unit comprising a first moiety having formula (M-1) and a second repeating unit comprising a second moiety having formula (M-2):

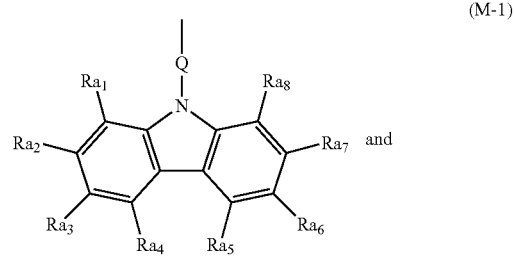

-continued (M-2)

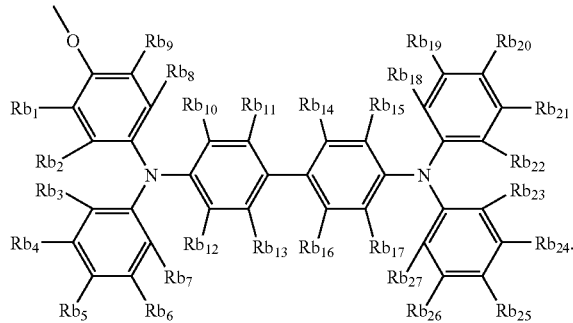

wherein each Q in (M-1) and (M-2) independently represents an unsubstituted or substituted alkylene group; and wherein $Ra_1$-$Ra_8$ and $Rb_1$-$Rb_{27}$ in (M-1) and (M-2) are each independently selected from the group consisting of hydrogen, $C_1$-$C_{10}$ alkyl, $C_4$-$C_{10}$ aryl and $C_4$-$C_{10}$ heteroaryl.

In another embodiment, the polymer is further configured to provide an initial diffraction efficiency of 50% or higher.

Embodiments of the invention have great utility in a variety of optical applications, including holographic storage, optical correlation, phase conjugation, non-destructive evaluation and imaging. Embodiments of non-linear optical devices include hologram medium device, hologram memory device, optical limiter, image correction device and correlator device.

DETAILED DESCRIPTION OF THE PREFERRED EMBODIMENT

Non-Linear Optical Devices

Figure 1:
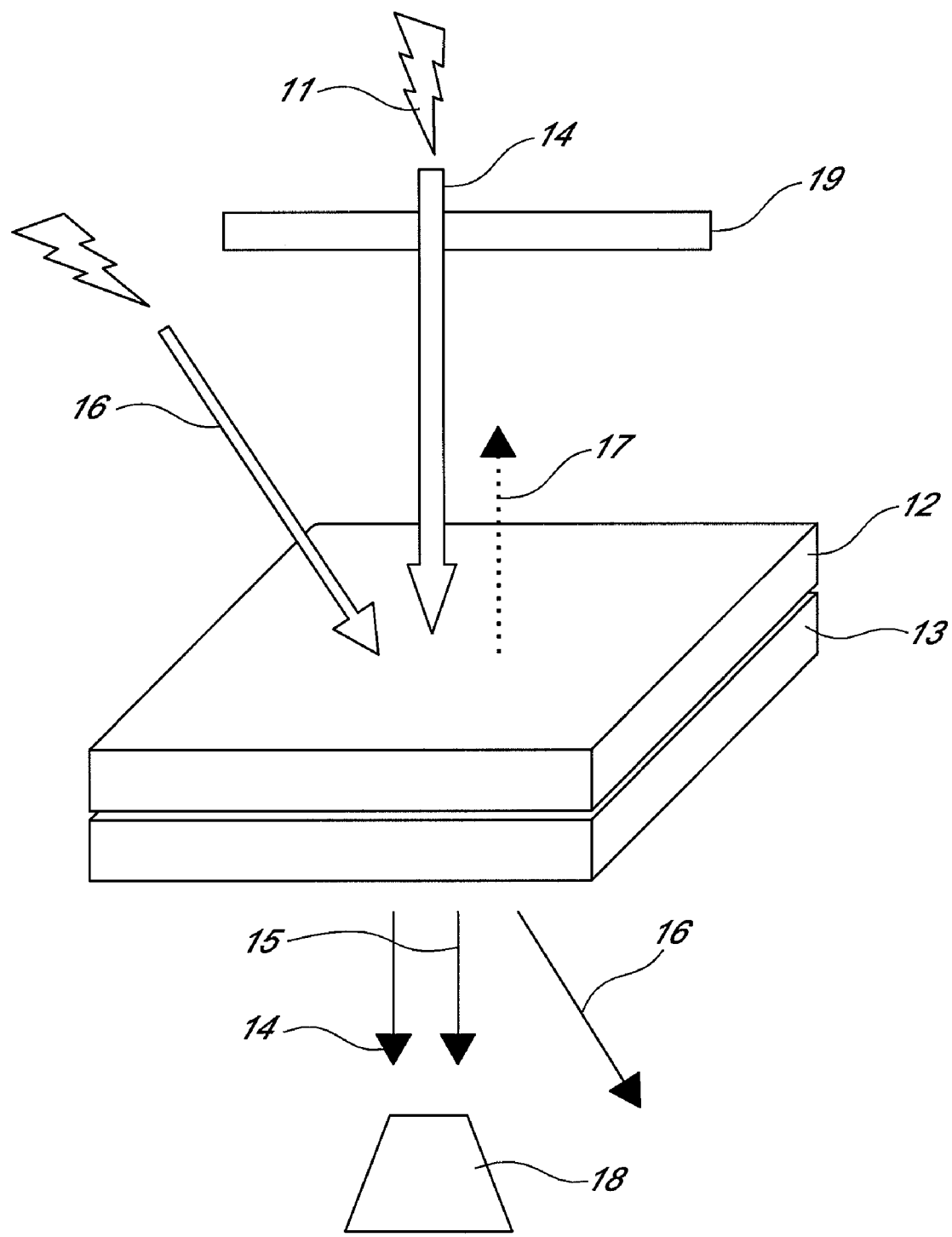
FIG. 1 is a schematic depiction illustrating a hologram recording system with a photorefractive polymer.

An embodiment of this invention provides a non-linear optical device comprising a polymer configured to provide a grating holding ratio of 20% or higher. Grating holding ratio is defined as ? (4 min)/? (initial), wherein ? (4 min) is diffraction efficiency after 4 minutes and the ? (initial) is initial diffraction efficiency. The polymer comprises a first repeating unit comprising a first moiety having formula (M-1) and a second repeating unit comprising a second moiety having formula (M-2):

(M-1)

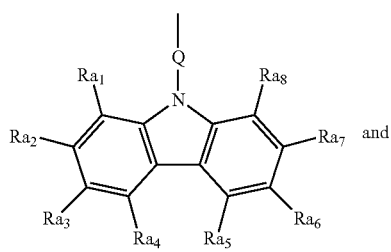 and

-continued (M-2)

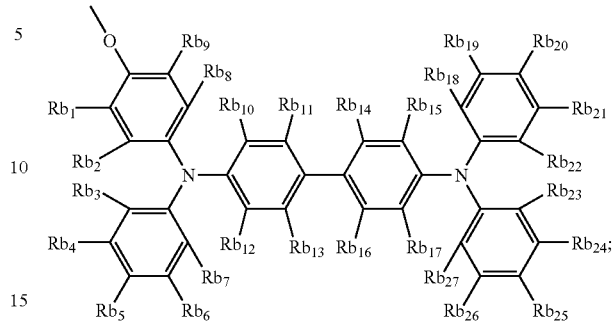

wherein each Q in (M-1) and (M-2) independently represents an unsubstituted or substituted alkylene group; and wherein $Ra_1$-$Ra_8$ and $Rb_1$-$Rb_{27}$ in (M-1) and (M-2) are each independently selected from the group consisting of hydrogen, $C_1$-$C_{10}$ alkyl, $C_4$-$C_{10}$ aryl and $C_4$-$C_{10}$ heteroaryl. Preferably, each Q in (M-1) and (M-2) is independently an alkylene group represented by $(CH_2)_p$ where p is in the range of about 2 and about 6. In some embodiments, the initial diffraction efficiency may also be 50% or higher.

This invention is not bound by theory, but it is believed that the repeating units that include the first and the second moieties represented by formulas (M-1) and (M-2), respectively, act as photoconductors in the polymer. Preferably, the photoconductivities of the repeating units that include moiety (M-1) or (M-2) are different. The first repeating unit comprising moiety (M-1) preferably provides higher photoconductivity and contributes to a fast response time and high sensitivity, while the second repeating unit comprising moiety (M-2) preferably contributes to a relatively high grating holding ratio.

The ratio of the first repeating unit comprising moiety (M-1) to the second repeating unit comprising moiety (M-2) in the polymer may vary over a broad range. In some embodiments, the ratio of the first to second repeating units may be from about 1:10 to about 5:1, preferably from about 1:6.6 to about 4:1.

In another embodiment, the polymer that is configured to provide a grating holding ratio of 20% or higher comprises a third repeating unit that includes a third moiety represented by formula (M-3):

(M-3)

wherein Q in (M-3) independently represents an unsubstituted or substituted alkylene group, $R_1$ in (M-3) is selected from the group consisting of hydrogen, $C_1$-$C_{10}$ alkyl, $C_4$-$C_{10}$ aryl and $C_4$-$C_{10}$ heteroaryl, G in (M-3) is a p-conjugated group, and Eacpt in (M-3) is an electron acceptor group. In some embodiments, $R_1$ in (M-3) is preferably an alkyl group selected from the group consisting of methyl, ethyl, propyl, butyl, pentyl and hexyl. In some embodiments, Q in (M-3) is preferably an alkylene group represented by $(CH_2)_p$ where p is between about 2 and about 6, and more preferably selected from the group consisting of ethylene, propylene, butylene, pentylene, hexylene and heptylene. The Q in formula (M-3) may be the same or different from the Q in formulas (M-1) and (M-2).

In some embodiments, "G=" in formula (M-3) may be represented by a structure selected from the group consisting of the following formulas:

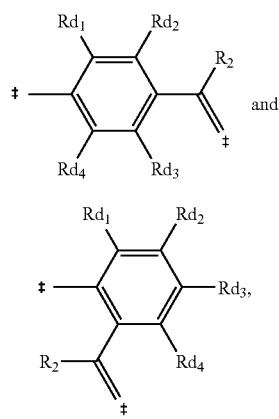

wherein $Rd_1$-$Rd_4$ and $R_2$ in (G-1) and (G-2) are each independently selected from the group consisting of hydrogen, $C_1$-$C_{10}$ alkyl, $C_4$-$C_{10}$ aryl and $C_4$-$C_{10}$ heteroaryl. In some embodiments, $Rd_1$-$Rd_4$ in (G-1) and (G-2) are preferably hydrogen.

In some embodiments, Eacpt in formula (M-3) may be represented by a structure selected from the group consisting of the following formulas:

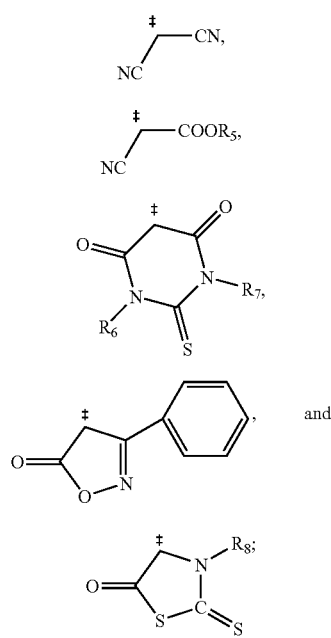

wherein $R_5$, $R_6$, $R_7$ and $R_8$ in (E-2), (E-3), and (E-5) are each independently selected from the group consisting of hydrogen, $C_1$-$C_{10}$ alkyl, $C_4$-$C_{10}$ aryl and $C_4$-$C_{10}$ heteroaryl.

Many polymer backbones, including but not limited to, polyurethane, epoxy polymers, polystyrene, polyether, polyester, polyamide, polyimide, polysiloxane, and polyacrylate, with the appropriate side chains attached can be used to make the polymers described herein. Some embodiments contain backbone units based on acrylates or styrene, and one of many preferred backbone units are formed from acrylate-based monomers, and another is formed from methacrylate monomers. It is believed that the first polymeric materials to include photoconductive functionality in the polymer itself were the polyvinyl carbazole materials developed at the University of Arizona. However, these polyvinyl carbazole polymers tend to become viscous and sticky when subjected to the heat-processing methods typically used to form the polymer into films or other shapes for use in photorefractive devices.

The (meth)acrylate-based and the acrylate-based polymers used in preferred embodiments of the invention have much better thermal and mechanical properties. In other words, they provide better workability during processing by injection-molding or extrusion, especially when the polymers are prepared by radical polymerization.

Some embodiments provide a non-linear optical device comprising a polymer configured to provide a grating holding ratio of 20% or higher, wherein the polymer comprises a first repeating unit represented by formula (U-1) and a second repeating unit represented by formula (U-2):

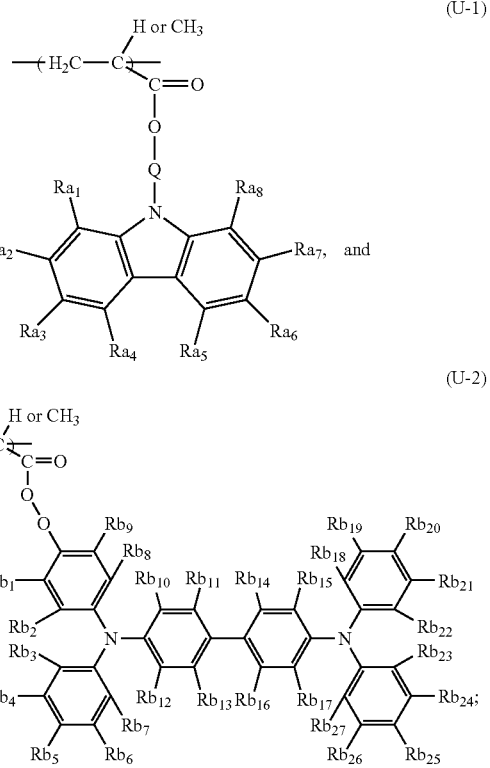

wherein each Q in (U-1) and (U-2) independently represents an unsubstituted or substituted alkylene group, and wherein $Ra_1$-$Ra_8$ and $Rb_1$-$Rb_{27}$ in (U-1) and (U-2) are each independently selected from the group consisting of hydrogen, $C_1$-$C_{10}$ alkyl, $C_4$-$C_{10}$ aryl and $C_4$-$C_{10}$ heteroaryl. The alkyl group can be either branched or linear alkyl. In some embodiments, each Q in (U-1) and (U-2) is independently an alkylene group represented by $(CH_2)_p$ where p is between about 2 and about 6. In some embodiments, each Q in (U-1) and (U-2) is independently selected from the group consisting of ethylene, propylene, butylene, pentylene, hexylene, and heptylene.

In some embodiments, the polymer used in the non-linear optical device further comprises a third repeating unit represented by the following formula:

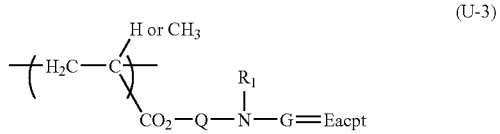

(U-3)

wherein Q in (U-3) independently represents an unsubstituted or substituted alkylene group, $R_1$ in (U-3) is selected from the group consisting of hydrogen, $C_1$-$C_{10}$ alkyl, $C_4$-$C_{10}$ aryl and $C_4$-$C_{10}$ heteroaryl, G in (U-3) is a p-conjugated group, and Eacpt in (U-3) is an electron acceptor group. Preferably Q in (U-3) is an alkylene group represented by $(CH_2)_p$ where p is between about 2 and about 6. The alkyl group can be either branched or linear alkyl. In some embodiments, $R_1$ in (U-3) is an alkyl group selected from methyl, ethyl, propyl, butyl, pentyl and hexyl. In some embodiments, Q in (U-3) is selected from the group consisting of ethylene, propylene, butylene, pentylene, hexylene, and heptylene.

The term "p-conjugated group" refers to a molecular fragment that contains p-conjugated bonds. The p-conjugated bonds refer to covalent bonds between atoms that have s bonds and p bonds formed between two atoms by overlaping of atomic orbits (s+p hybrid atomic orbits for s bonds and p atomic orbits for p bonds). "G=" in formula (U-3) may be represented by a structure selected from the group consisting of the following formulas:

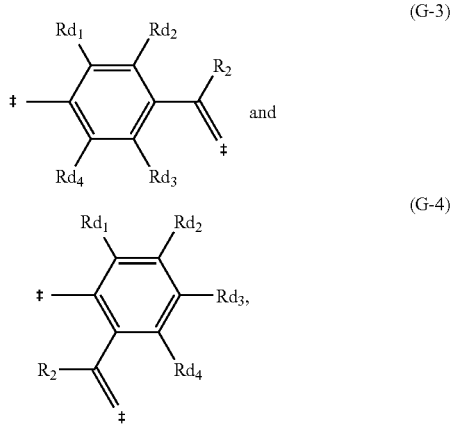

(G-3)

(G-4)

wherein $Rd_1$-$Rd_4$ and $R_2$ in (G-3) and (G-4) are each independently selected from the group consisting of hydrogen, $C_1$-$C_{10}$ alkyl, $C_4$-$C_{10}$ aryl and $C_4$-$C_{10}$ heteroaryl. In an embodiment, $Rd_1$-$Rd_4$ in (G-3) and (G-4) are hydrogen.

The term "electron acceptor group" refers to a group of atoms with a high electron affinity that can be bonded to a p-conjugated group. Exemplary electron acceptors, in order of increasing strength, are: $C(O)NR^2<C(O)NHR<C(O)NH_2<C(O)OR<C(O)OH<C(O)R<C(O)H<CN<S(O)_2R<NO_2$, wherein each R in these electron acceptors may independently be, for example, hydrogen, $C_1$-$C_{10}$ alkyl, and $C_4$-$C_{10}$ aryl, wherein the alkyl may be branched or linear.

Eacpt in formula (U-3) may be represented by a structure selected from the group consisting of the following formulas:

(E-6)

(E-7)

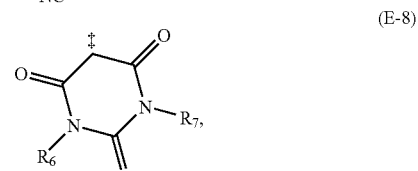

(E-8)

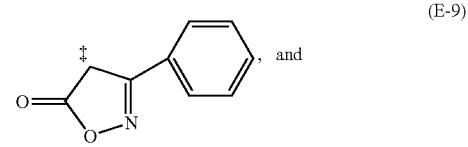

(E-9)

, and

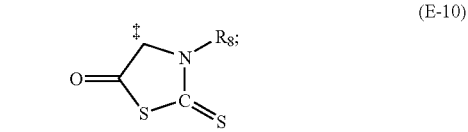

(E-10)

wherein $R_5$, $R_6$, $R_7$ and $R_8$ in (E-7), (E-8), and (E-10) are each independently selected from the group consisting of hydrogen, $C_1$-$C_{10}$ alkyl, $C_4$-$C_{10}$ aryl and $C_4$-$C_{10}$ heteroaryl, wherein alkyl may be branched or linear.

The inclusion of the repeating units (U-1), (U-2) and/or (U-3) in a copolymer tends to contribute to its miscibility in a photorefractive composite. The repeating units (U-1) and (U-2) show good miscibility with photoconductive plasticizers and the repeating unit (U-3) exhibits a good affinity with non-linear chromophores. The copolymer chemical structure of the embodiments enables the photorefractive composition in the embodiments to have good phase stabilities, and as a result, little or no phase separation and haziness were observed in preferred photorefractive device embodiments after several months.

The polymers described herein may be prepared in various ways, e.g., by polymerization of the corresponding monomers or precursors thereof. Polymerization may be carried out by methods known to a skilled artisan, as informed by the guidance provided herein. In some embodiments, radical polymerization using an azo-type initiator, such as AIBN (azoisobutyl nitrile), may be carried out. The radical polymerization technique makes it possible to prepare random or block copolymers comprising both charge transport and non-linear optical groups. Further, by following the techniques described herein, it is possible to prepare such materials with exceptionally good photoconductivity, fast response time and high diffraction efficiency. In an embodiment of a radical polymerization method, the polymerization catalysis is generally used in an amount of from 0.01 to 5 mole % or from 0.1 to 1 mole % per mole of the total polymerizable monomers. In some embodiments, radical polymerization can be carried out under an inert gas (e.g., nitrogen, argon, or helium) and/or in the presence of a solvent (eg., ethyl acetate, tetrahydrofuran, butyl acetate, toluene or xylene). Polymerization may be carried out under a pressure from 1 to 50 Kgf/cm² or from 1 to 5 Kgf/cm². In some embodiments, the concentration of total polymerizable monomer in a solvent may be about 0.1% to about 80% by weight, preferably about 0.5% to about 60%, more preferably about 1% to about 40%, and even more preferably about 1% to about 30% by weight. The polymerization may be carried out at a temperature of about 50° C. to about 100° C., and may be allowed to continue for about 1 to about 100 hours, depending on the desired final molecular weight, polymerization temperature, and taking into account the polymerization rate.

Non-limiting examples of monomers that may be copolymerized to form a non-linear optical component include those comprising a chromophore group, such as N-ethyl, N-4-dicyanomethylidenyl acrylate and N-ethyl, N-4-dicyanomethylidenyl-3,4,5,6,10-pentahydronaphtylpentyl acrylate. To prepare the non-linear optical component of the copolymer, monomers that have side-chain groups possessing non-linear-optical ability may be used. Non-limiting examples of such monomers include:

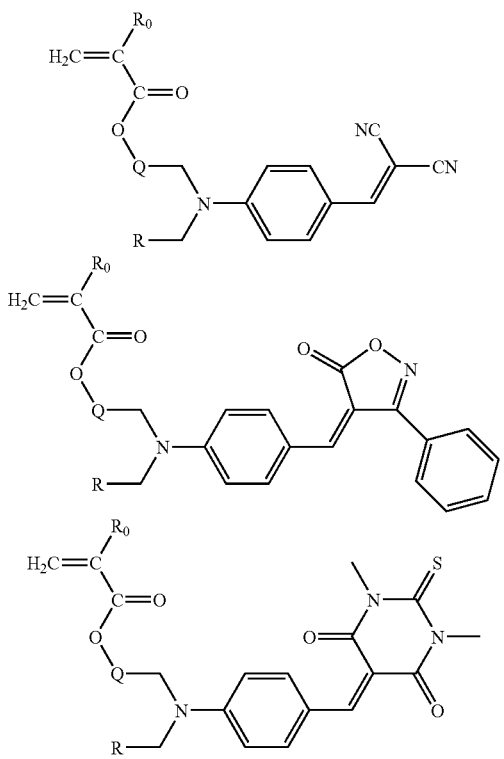

wherein each Q in the monomers above independently represents an unsubstituted or substituted alkylene group, each $R_0$ in the monomers above is hydrogen or methyl and each R in the monomers above is independently $C_1$-$C_{10}$ alkyl. In some embodiments, Q in the monomers above may be an alkylene group represented by $(CH_2)_p$ where p is in the range of about 2 to about 6. The alkylene group may contain one or more hetero atoms (e.g., O or S). In some embodiments, each R in the monomers above may be selected from the group consisting methyl, ethyl and propyl. Each $R_0$ in the monomers above may be H or $CH_3$.

A new polymerization method involving the use of a precursor monomer with a functional group for non-linear optical ability can be used to prepare the copolymers. In some embodiments, the precursor monomer may be represented by the following formula:

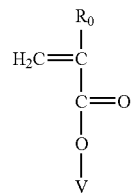

(P-1)

wherein $R_0$ in (P-1) is hydrogen or methyl and V is selected from (V-1) or (V-2):

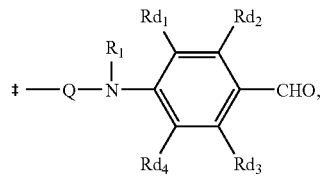

(V-1)

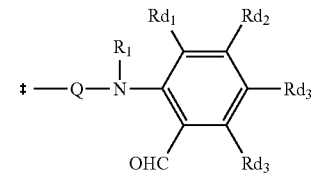

(V-2)

wherein each Q in (V-1) and (V-2) independently represents an unsubstituted or substituted alkylene group, $Rd_1$-$Rd_4$ in (V-1) and (V-2) are each independently selected from the group consisting of hydrogen, $C_1$-$C_{10}$ alkyl, $C_4$-$C_{10}$ aryl, and $R_1$ is $C_1$-$C_{10}$ alkyl (branched or linear). In some embodiments, Q in (V-1) and (V-2) may be an alkylene group represented by $(CH_2)_p$ where p is in the range of about 2 to about 6. The alkylene group may contain one or more hetero atoms (e.g., O or S). In some embodiments, $R_1$ in (V-1) and (V-2) is selected from a group consisting of methyl, ethyl, propyl, butyl, pentyl and hexyl. In an embodiment, $Rd_1$-$Rd_4$ in (V-1) and (V-2) are hydrogen.

This new polymerization method works under similar initial operating conditions as for the conventional radical polymerization described above, and it also follows a similar procedure to form the precursor polymer. After the precursor copolymer has been formed, it can be converted into the corresponding copolymer having non-linear optical groups and capabilities by a condensation reaction. In some embodiments, the condensation reagent may be selected from the group consisting of:

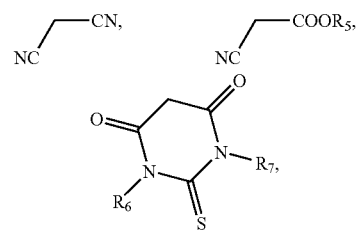

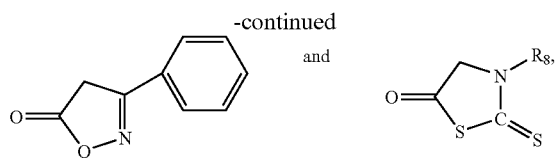

wherein $R_5$, $R_6$, $R_7$ and $R_8$ of the condensation reagents above are each independently selected from the group consisting of hydrogen, $C_1$-$C_{10}$ alkyl and $C_4$-$C_{10}$ aryl. The alkyl group may be either branched or linear.

The condensation reaction can be done in the presence of a pyridine derivative catalyst at room temperature for about 1-100 hrs. In some embodiments, a solvent, such as butyl acetate, chloroform, dichloromethylene, toluene or xylene, can also be used. In some embodiments, the reaction may be carried out without the catalyst at a solvent reflux temperature of 30° C. or above for about 1 to 100 hours.

In some embodiments, the non-linear optical device may comprise a copolymer that provides photoconductive (charge transport) ability and non-linear optical ability. The polymer in the optical device may also include other components as desired, such as sensitizer and/or plasticizer components. Some embodiments provide a non-linear optical device that comprises a copolymer. The copolymer may comprise a first repeating unit that includes a first moiety with charge transport ability, a second repeating unit including a second moiety with non-linear-optical ability, and an optional third repeating unit that includes a third moiety with plasticizing ability.

Those having ordinary skill in the art, using routine experimentation guided by the disclosure herein, can vary the components of the polymer to make a photorefractive polymer having long grating persistency. For example, specific examples of polymers with long grating persistency are described in the examples below. Using such polymers as a starting point, those skilled in the art can use routine experimentation to identify other polymers that also exhibit fast response time and high diffraction efficiency, along with long diffractive grating lasting time and phase stability. For example, the molecular weight of the polymer may be varied over a broad range. In addition, the ratio of differing types of repeating units may be varied to create a polymer that having long grating persistency. For example the ratio of a first repeating unit that includes a first moiety with charge transport ability to a second repeating unit including a second moiety with non-linear-optical ability may be varied over a broad range. Additionally, a third repeating unit that includes a third moiety with plasticizing ability may further be provided in a variety of ratios to the first repeating unit and/or the second repeating unit.

Various ratios of different types of monomers may be used in forming the copolymer. Some embodiments may provide an optical device with the first repeating unit (e.g., the repeating unit with charge transport ability) to the second repeating unit (e.g., the repeating unit with non-linear optical ability) weight ratio of about 100:1 to about 0.5:1, preferably about 10:1 to about 1:1. When the weight ratio is less than 0.5:1, the charge transport ability of copolymer may be relatively weak, and the response time may be undesirably slow to give good photorefractivity. On the other hand, if this weight ratio is larger than about 100:1, the non-linear-optical ability of the copolymer may be relatively weak, and the diffraction efficiency may be too low to give good photorefractivity.

In some embodiments, the polymer has a weight average molecular weight, Mw, of from about 3,000 to about 500,000, preferably from about 5,000 to about 100,000. The term "weight average molecular weight" as used herein means the value determined by the GPC (gel permeation chromatography) method using polystyrene standards, as is well known in the art.

As another component of the non-linear optical device, the chromophore or group that provides the non-linear optical functionality may be any group known in the art that can provide such capability. In some embodiments, these non-linear optical components may be incorporated into the polymer matrix by attaching to the polymer as a side chain and/or as additive components.

The chromophore or group that provides the non-linear optical functionality may be represented by (M-4):

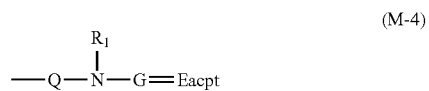

wherein Q in (M-4) independently represents an unsubstituted or substituted alkylene group, $R_1$ in (M-4) is selected from the group consisting of hydrogen, $C_1$-$C_{10}$ alkyl, $C_4$-$C_{10}$ aryl and $C_4$-$C_{10}$ heteroaryl, G in (M-4) is a p-conjugated group, and Eacpt in (M-4) is an electron acceptor group. In some embodiments, Q in (M-4) may be an alkylene group represented by $(CH_2)_p$ where p is in the range of about 2 to about 6. In some embodiments Q in (M-4) may be selected from the group consisting of ethylene, propylene, butylene, pentylene, hexylene, and heptylene. In some embodiments, $R_1$ in (M-4) may be selected from the group consisting of methyl, ethyl, propyl, butyl, pentyl and hexyl.

Functional groups disclosed in U.S. Pat. No. 6,267,913 may be useful as an electron acceptor group in some embodiments:

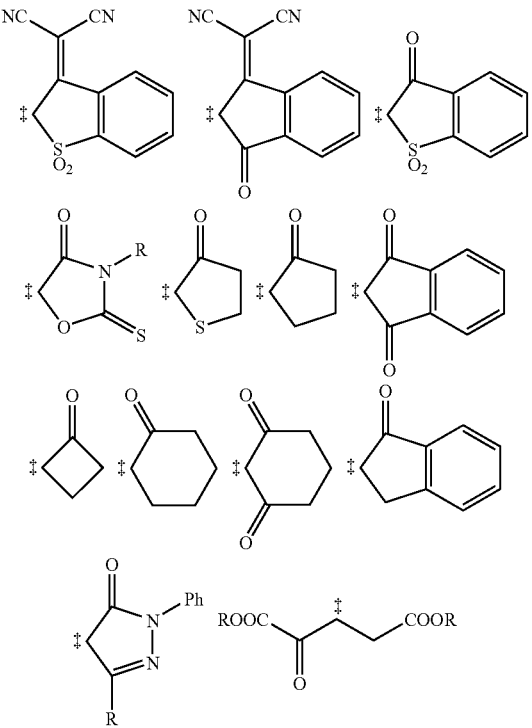

-continued

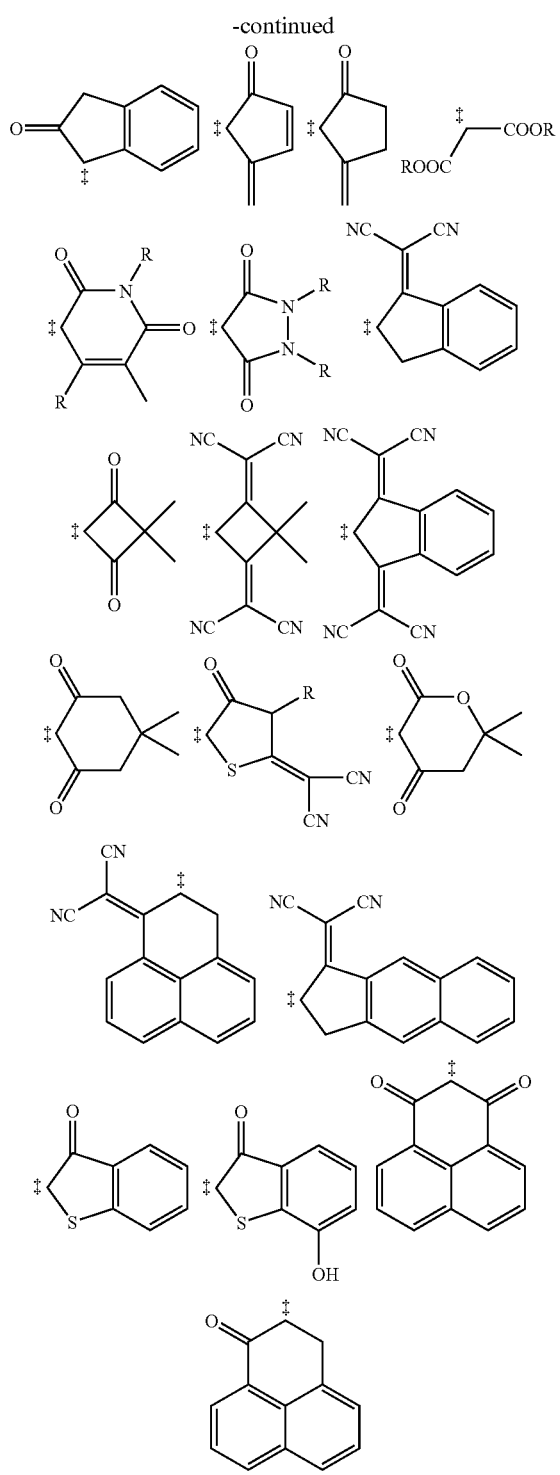

wherein R in the functional groups above is independently selected from the group consisting of hydrogen, $C_1$-$C_{10}$ alkyl and $C_4$-$C_{10}$ aryl, wherein the alkyl may be branched or linear. The symbol "‡" in a chemical structure throughout this application specifies an atom of attachment to another chemical group and indicates that the structure is missing a hydrogen that would normally be implied by the structure in the absence of the "‡."

In some embodiments, "G=" in formula (M-4) is a non-linear optical functionality, and may be represented by a structure selected from the group consisting of the following formulas:

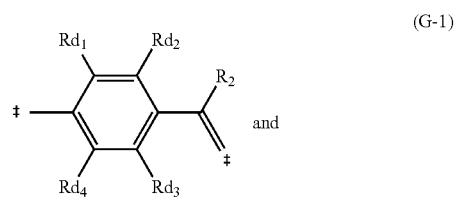

(G-1)

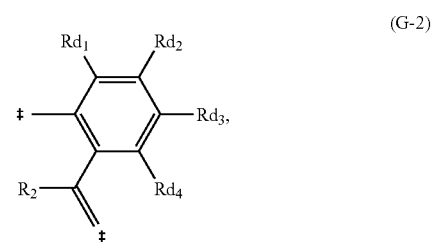

(G-2)

wherein $Rd_1$-$Rd_4$ and $R_2$ in (G-1) and (G-2) are each independently selected from the group consisting of hydrogen, $C_1$-$C_{10}$ alkyl, $C_4$-$C_{10}$ aryl and $C_4$-$C_{10}$ heteroaryl. In some embodiments, derivatives of the following structures may be useful as a non-linear optical functionality:

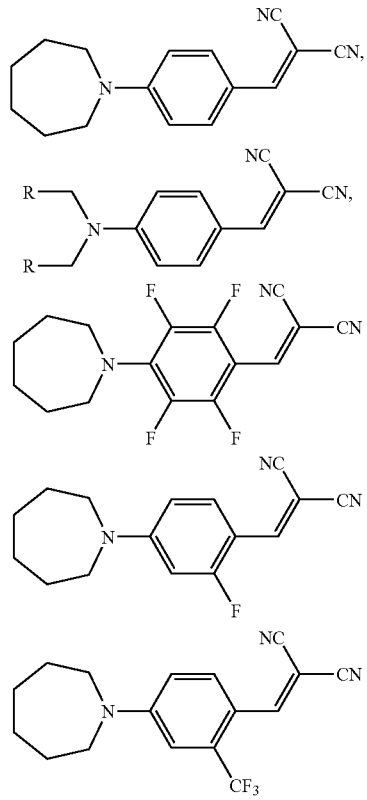

-continued

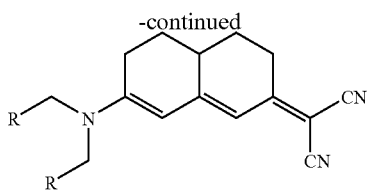

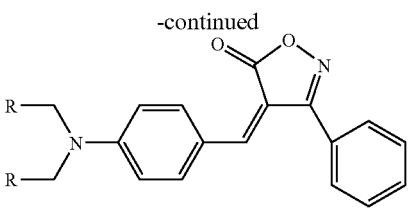

wherein R in the structures above is independently a group selected from the group consisting of hydrogen, $C_1$-$C_{10}$ alkyl and $C_4$-$C_{10}$ aryl, wherein the alkyl may be branched or linear Other chromophores that possess non-linear optical properties in a polymer matrix are described in U.S. Pat. No. 5,064,264 (incorporated herein by reference) may also be used in some embodiments. Additional suitable materials known in the art may also be used, and are well described in the literature, such as D. S. Chemla & J. Zyss, "Nonlinear Optical Properties of Organic Molecules and Crystals" (Academic Press, 1987). U.S. Pat. No. 6,090,332 describes fused ring bridge and ring locked chromophores that can form thermally stable photorefractive compositions, which may be useful as well. In some embodiments, chromophore additives having the following chemical structures can be used.

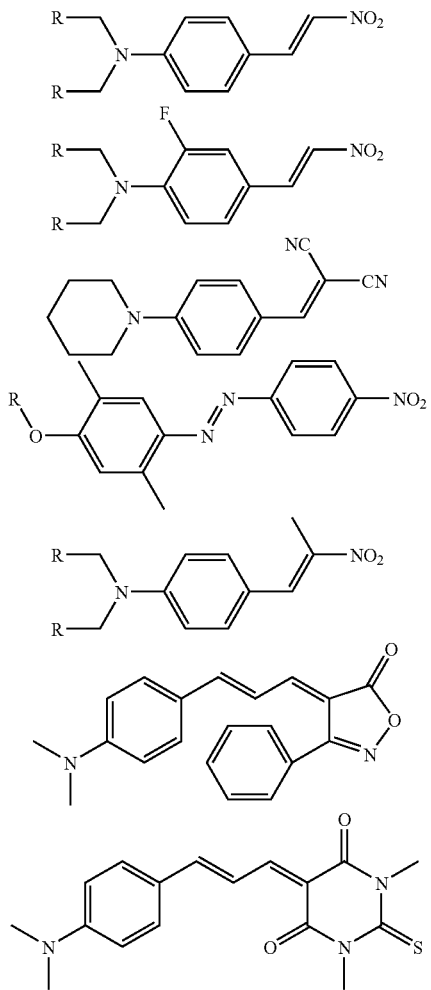

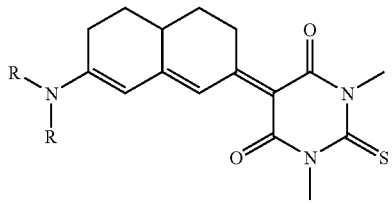

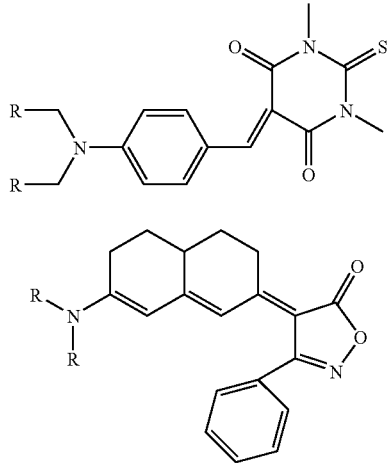

wherein R in the chromophore additives above is independently selected from the group consisting of hydrogen, $C_1$-$C_{10}$ alkyl and $C_4$-$C_{10}$ aryl, wherein the alkyl may be branched or linear.

The chosen compound(s) is sometimes mixed in the copolymer in a concentration of about 1% to about 80% by weight, more preferably about 1% to about 40% by weight. In some embodiments, a monomer containing a non-linear optical group is used instead of or in addition to a monomer containing a precursor group for non-linear optical ability. The conversion of precursor group to a non-linear optical group after polymerization tends to result in a polymer of lower polydispersity. The polymer can be mixed with a component that possesses plasticizer properties, and any commercial plasticizer compound can be used, such as phthalate derivatives or low molecular weight hole transfer compounds (e.g., N-alkyl carbazole or triphenylamine derivatives or acetyl carbazole or triphenylamine derivatives).

Non-limiting examples of plasticizer compounds include ethyl carbazole; 4-(N,N-diphenylamino)-phenylpropyl acetate; 4-(N,N-diphenylamino)-phenylmethyloxy acetate; N-(acetoxypropylphenyl)-N,N',N'-triphenyl-(1,1'-biphenyl)-4,4'-diamine; N-(acetoxypropylphenyl)-N'-phenyl-N,N'-di(4-methylphenyl)-(1,1'-biphenyl)-4,4'-diamine; N-(acetoxypropylphenyl)-N'-phenyl-N,N'-di(4-butoxyphenyl)-(1,1'-biphenyl)-4,4'-diamine and combination thereof. These compounds can be used singly or in mixtures of two or more plasticizers. Furthermore, un-polymerized monomers can be plasticizers and/or low molecular weight hole transfer compounds, for example 4-(N,N-diphenylamino)-phenylpropyl (meth)acrylate; N-[(meth)acroyloxypropylphenyl]-N,N',N'-triphenyl-(1,1'-biphenyl)-4,4'-diamine; N-[(meth)acroyloxypropylphenyl]-N'-phenyl-N,N'-di(4-methylphenyl)-(1,1'-biphenyl)-4,4'-diamine; and N-[(meth)acroyloxypropylphenyl]-N'-phenyl-N,N'-di(4-buthoxyphenyl)-(1,1'-biphenyl)-4,4'-diamine. These monomers can also be used singly or in mixtures of two or more monomers.

In some embodiments, plasticizers like N-alkyl carbazole or triphenylamine derivatives containing electron acceptor group can stabilize the photorefractive composition, because the plasticizers contain both N-alkyl carbazole or triphenylamine moiety and non-linear optical moiety in one compound. The plasticizer may be selected from the following formulas:

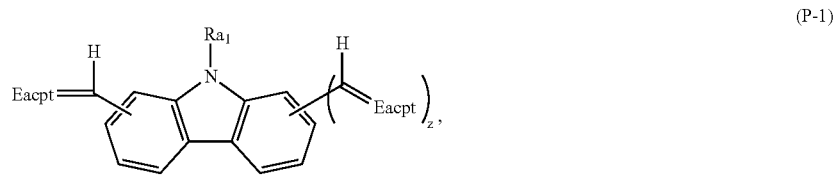
(P-1)

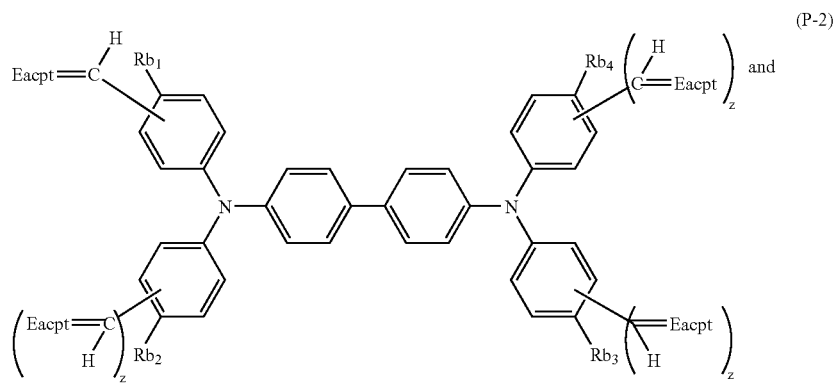
(P-2)

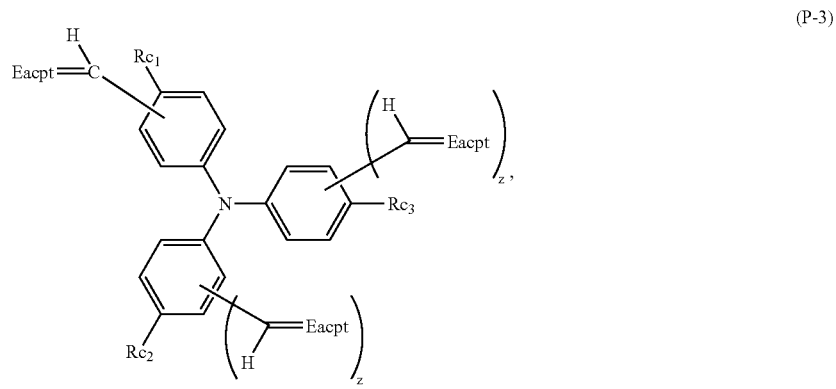
(P-3)

wherein $Ra_1$, $Rb_1$-$Rb_4$ and $Rc_1$-$Rc_3$ in (P-1), (P-2), and (P-3) are each independently selected from the group consisting of hydrogen, $C_1$-$C_{10}$ alkyl and $C_4$-$C_{10}$ aryl, z is 0 or 1, and Eacpt in (P-1), (P-2), and (P-3) is an electron acceptor group and represented by a structure selected from the group consisting of the following formulas:

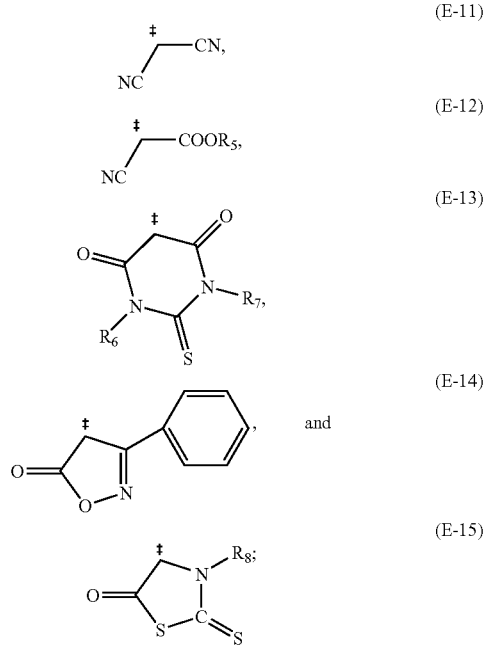

wherein $R_5$, $R_6$, $R_7$ and $R_8$ in (E-12), (E-13), and (E-15) are each independently selected from the group consisting of hydrogen, $C_1$-$C_{10}$ alkyl, $C_4$-$C_{10}$ aryl and $C_4$-$C_{10}$ heteroaryl, wherein alkyl may be branched or linear.

Embodiments of this invention provide polymers having comparatively low glass transition temperature ($T_g$) when compared with similar polymers prepared by prior art methods. By selecting copolymers of moderate Tg and by using methods that tend to depress the average Tg, it is possible to limit the amount of plasticizer required for the composition and reduce or eliminate the inclusion of plasticizers. In some embodiments, the amount of plasticizer may be reduced so that it is about 1 to about 30% of the total composition, including about 1 to about 25% of the total composition, or about 1 to about 20% of the total composition.

In some embodiments, other components may be added to the polymer matrix to provide or improve the desired physical properties for a non-linear optical device. In an embodiment, a photosensitizer may be added to serve as a charge generator for good photorefractive capability. A wide variety of such photosensitizers is known in the art. In some embodiments, useful photosensitizers may be 2,4,7-trinitro-9-fluorenone dicyanomalonate (TNFDM), dinitro-fluorenone, mononitro-fluorenone and C60, and the amount of photosensitizer included is usually about 0.5 to about 3% by weight, based on the total weight.

Embodiments of this invention show very good phase stabilities and display little or no haziness even after several months. Without phase separation, good photorefractive properties remain.

FIG. 1 is a schematic depiction illustrating a hologram recording system with a photorefractive polymer. Information may be recorded into the hologram medium, and the recorded information may be read out simultaneously. A laser source 11 may be used as to write information onto a recording medium 12. The recording medium 12 comprises the photorefractive polymer described herein and is positioned over a support material 13.

Laser beam irradiation of object beam 14 and reference beam 16 into the recording medium 12 causes interference grating, which generates internal electric fields and a refractive index change. Multiple recordings are possible in the photorefractive polymer of the recording medium 12 by changing the angle of the incident beam. The object beam 14 has a transmitted portion 15 of the beam and a refracted portion 17 of the beam.

An image display device 19 is set up parallel to the X-Y plane of the recording medium 12. Various types of image display devices may be employed. Some non-limiting examples of image display devices include a liquid crystal device, a Pockels Readout Optical Modulator, a Multichannel Spatial Modulator, a CCD liquid crystal device, an AO or EO modulation device, or an opto-magnetic device. On the other side of the recording medium 12, a read-out device 18 is also set up parallel to the X-Y plane of the recording medium 12. Suitable read-out devices include any kind of opto-electro converting devices, such as CCD, photo diode, photoreceptor, or photo multiplier tube.

In order to read out recorded information, the object beam 14 is shut out and only the reference beam 16, which is used for recording, is irradiated. A reconstructed image may be restored, and the reading device 18 is installed in the same direction as the transmitted portion 15 of the object beam and away from the reference beam 16. However, the position of the reading device 18 is not restricted to the positioning shown in FIG. 1. Recorded information in the photorefractive polymer can be erased completely by whole surface light irradiation, or partially erased by laser beam irradiation.

The method can build the diffraction grating on the recording medium. This hologram device can be used not only for optical memory devices but also other applications, such as a hologram interferometer.

For embodiments of the non-linear optical device, the thickness of a photorefractive polymer layer is from about 10 µm to about 200 µm. In some embodiments, the thickness range is between about 30 µm and about 150 µm. If the sample thickness is less than 10 µm, the diffracted signal may not be in desired Bragg Refraction region, but in Raman-Nathan Region generally does not show desired grating behavior. On the other hand, if the sample thickness is greater than 200 µm, an overly high biased voltage may be involved to show grating behavior. In addition, composition transmittance for green laser beam can be reduced significantly and may result in no grating signals.

A green laser is a laser which emits light at wavelengths between 500 nm and 570 nm. In an embodiment, a green laser light source at a wavelength of 532 nm laser can be used. Furthermore, some embodiments show sensitivity to both green continuous wave laser and green pulse laser. However, continuous wave laser system can be affected by vibration during measurement and laser operations, while pulse laser is vibration free and more widely used. Thus, pulse laser system availability can be greatly advantageous and useful for industrial application purpose and image storage purpose.

Device Characterizations

Measurement Method and Geometry: The diffraction efficiency of the material can be measured through four-wave mixing (FWM) experiments performed in a tilted-sample geometry. The writing beams can be incident on the sample with an inter-beam angle of 20° in air and the sample surface can be tilted 60° relative to the writing beam bisector resulting in a grating period of 2.7 μm.

In the CW mode, two s-polarized beams (532 nm) of equal illumination flux (0.75 W/cm² each) can be used to record the grating and a weak counter-propagating p-polarized beam (532 nm or 633 nm) can probe the efficiency of the grating. In the pulsed mode, single-shot 3 mJ/cm² pulse energy (based on 1/e diameter) with 1 ns pulse-width is used. The steady-state diffraction efficiency is monitored through increasing bias field. The diffraction efficiency of the composite is calculated by dividing the diffracted signal over the incident signal power. In the case when a 633 nm p-polarized beam is used, the reading angle is deviated from the 532 nm beam reading angle by about 4 degrees.

Transient diffraction efficiency of the sample is measured in the same geometry described above. Instead of a steady increase of field, a fixed (65 V/μm) bias field is applied and the recording beams (with a total irradiance of 1.5 W/cm²) are turned on through a shutter in the transient case. The rise of diffraction efficiency is recorded in an oscilloscope. The rise curve is fitted to a bi-exponential growth function. The first fast time constant is usually reported.

In the pulsed mode, single shot pulses are used as recording beams. Each single pulse creates its own grating. The single-pulse incident upon the sample can have energy of 3 mJ/cm² with a pulse-width of 1 ns. A bias voltage of 9 kV is applied. The fast rise and decay of hologram recorded by each single-pulse is monitored through an oscilloscope.

Phase Stability: The tested samples are put into an oven at 60° C. At certain intervals, the opaqueness of samples is evaluated by observing the samples under a microscope. If there is little or no opaqueness, nor crystallization inside the composition, the sample is said to have a good phase stability.

The embodiments will now be further described by the following examples, which are intended to be illustrative of the embodiments, and do not limit the scope or underlying principles in any way.

EXAMPLES

Production Example 1

(a) Monomers Containing Charge Transport Groups

TPD acrylate monomer: TPD acrylate type charge transport monomers (N-[acryloyloxypropylphenyl]-N,N',N'-triphenyl-(1,1'-biphenyl)-4,4'-diamine) (TPD acrylate) was purchased from Fuji Chemical, Japan, and it has the following structure:

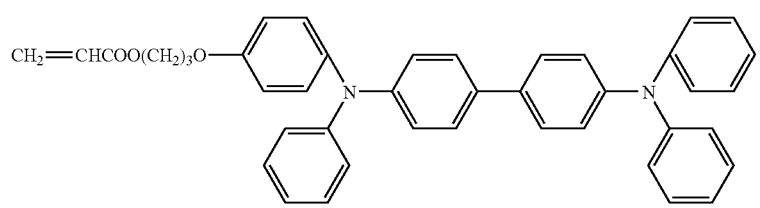

Carbazole acrylate monomer: the carbazole acrylate monomer was synthesized according to the following synthesis scheme:

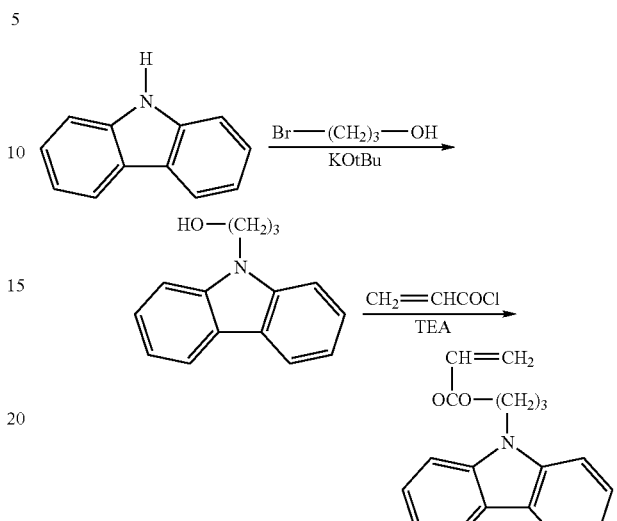

(b) Monomers Containing Non-linear-optical Groups

The non-linear-optical precursor monomer 5-[N-ethyl-N-4-formylphenyl]amino-pentyl acrylate was synthesized according to the following synthesis scheme:

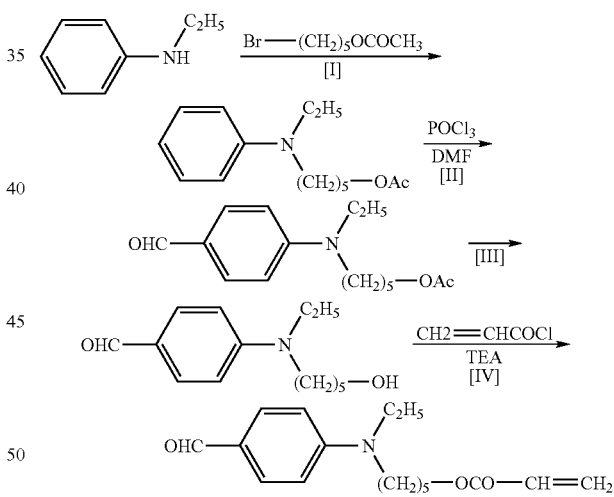

Step I:

Triethylamine (4.2 mL, 30 mmol) and N-ethylaniline (4 mL, 30 mmol) were added to bromopentyl acetate (5 mL, 30 mmol) and toluene (25 mL) at room temperature, and then heated at 120° C. overnight. After cooling down, the reaction mixture was rotary-evaporated. The residue was purified by silica gel chromatography (developing solvent: hexane/acetone=9/1). An oily amine compound was obtained (yield: 6.0 g, 80%).

Step II:

Anhydrous DMF (6 mL, 77.5 mmol) was cooled in an ice-bath. Then POCl₃ (2.3 mL, 24.5 mmol) was added dropwise to anhydrous DMF in a 25 mL flask, and the mixture was allowed to come to room temperature. The amine compound (5.8 g, 23.3 mmol) was diluted with dichloroethane (6 mL) and then added to the POCl₃ mixture through a rubber septum using a syringe. After stirring for 30 min., this reaction mixture was heated to 90° C. and the reaction was allowed to proceed overnight under an argon atmosphere.

After the reaction overnight, the reaction mixture was cooled, and poured into brine water and extracted by ether. The ether layer was washed with potassium carbonate solution and dried over anhydrous magnesium sulfate. After removing the magnesium sulfate, the solvent was removed and the residue was purified by silica gel chromatography (developing solvent: hexane/ethyl acetate=3/1). An aldehyde compound was obtained (yield: 4.2 g, 65%).

Step III:

The aldehyde compound (3.92 g, 14.1 mmol) was dissolved in methanol (20 mL). Potassium carbonate (400 mg) and water (1 mL) were added to the aldehyde compound/methanol mixture at room temperature and let stirred overnight. After stirring overnight, the solution was poured into brine water and extracted by ether. The ether layer was dried over anhydrous magnesium sulfate. After removing the magnesium sulfate, the solvent was removed and the residue was purified by silica gel chromatography (developing solvent: hexane/acetone 1/1). An aldehyde alcohol compound was obtained (yield: 3.2 g, 96%).

Step IV:

The aldehyde alcohol (5.8 g, 24.7 mmol) was dissolved with anhydrous THF (60 mL). Into this mixture, triethylamine (3.8 mL, 27.1 mmol) was added and the solution was cooled by ice-bath. Acrolyl chloride (2.1 mL, 26.5 mmol) was added and the solution was maintained at 0° C. for 20 minutes. Thereafter, the solution was allowed to warm up to room temperature and stirred at room temperature for 1 hour, at which point TLC indicated that all the alcohol compound has disappeared. The solution was poured into brine water and extracted by ether. The ether layer was dried over anhydrous magnesium sulfate. After removing the magnesium sulfate, the solvent was removed and the residue acrylate compound was purified by silica gel chromatography (developing solvent: hexane/acetone=1/1). The compound yield was 5.38 g (76%), and the compound purity was 99% (by GC).

c) Synthesis of Non-linear-optical Chromophore 7-FDCST

The non-linear-optical precursor 7-FDCST (7 member ring dicyanostyrene, 4-homopiperidino-2-fluorobenzylidene malononitrile) was synthesized according to the following two-step synthesis scheme:

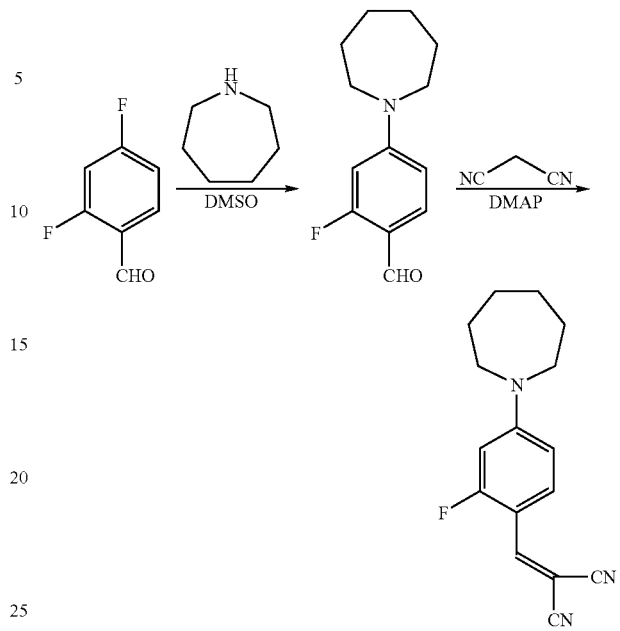

A mixture of 2,4-difluorobenzaldehyde (25 g, 176 mmol), homopiperidine (17.4 g, 176 mmol), lithium carbonate (65 g, 880 mmol), and DMSO (625 mL) was stirred at 50° C. for 16 hr. Water (50 mL) was then added to the reaction mixture. The products were extracted with ether (100 mL). After removal of ether, the crude products were purified by silica gel column chromatography using hexanes-ethyl acetate (9:1) as eluent and crude intermediate was obtained (22.6 g,). 4-(Dimethylamino)pyridine (230 mg) was added to a solution of the 4-homopiperidino-2-fluorobenzaldehyde (22.6 g, 102 mmol) and malononitrile (10.1 g, 153 mmol) in methanol (323 mL). The reaction mixture was kept at room temperature and the product was collected by filtration and purified by recrystallization from ethanol (yield 18.1 g, 38%).

d) Polymer Materials

Other materials besides the above monomers and initiator were purchased from Aldrich Chemicals, Milwaukee, Mich.

Production Example 2

Preparation of Copolymer by Azo Initiator (TPD Acrylate/Cbz Acrylate/Chromophore Type 5:5:1)

The charge transport monomer N-[(meth)acroyloxypropylphenyl]-N,N',N'-triphenyl-(1,1'-biphenyl)-4,4'-diamine (TPD acrylate, 2.5 g), N-[(meth)acroyloxypropylphenyl]-N, N'-diphenylamine (CBz acrylate) (2.5 g), and a non-linear-optical precursor monomer 5-[N-ethyl-N-4-formylphenyl] amino-pentyl acrylate (0.50 g), prepared as described in Production Example 1, were put into a three-necked flask. After toluene (60 mL) was added and purged by argon gas for 1 hour, azoisobutylnitrile (24 mg) was added into this solution. Then, the solution was heated to 65° C., while continuing to purge with argon gas.

After 18 hrs of polymerization, the polymer solution was diluted with toluene. The polymer was precipitated from the solution and added to methanol, and the resulting polymer precipitate was collected and washed in diethyl ether and methanol. The white polymer powder was collected and dried. The yield of polymer was about 100%.

To form the polymer with non-linear-optical capability, the precipitated precursor polymer (5.0 g) was dissolved in chloroform (24 mL). Into this solution, dicyanomalonate (1.0 g) and dimethylaminopyridine (40 mg) were added, and the reaction was allowed to proceed overnight at 40° C. The polymer was recovered from the solution by filtration of impurities, followed by precipitation in methanol, washing and drying.

Production Example 3

Preparation of Copolymer by Azo Initiator Polymerization (TPD Acrylate/CbZ Acrylate/Chromophore Type 7.5:2.5:1)

A photorefractive copolymer was obtained in the same manner as in the Production Example 2, except the monomers used were: N-[(meth)acroyloxypropylphenyl]-N,N',N'-triphenyl-(1,1'-biphenyl)-4,4'-diamine (TPD acrylate) (5.86 g), N-[(meth)acroyloxypropylphenyl]-N,N'-diphenylamine (CBz acrylate) (1.95 g), and the non-linear-optical precursor monomer 5-[N-ethyl-N-4-formylphenyl]amino-pentyl acrylate (0.78 g).

Comparative Production Example 1

Preparation of Homo-polymer by Azo Initiator Polymerization of Charge Transport Homopolymer (TPD Acrylate Type)

A photorefractive copolymer was obtained in the same manner as in the Production Example 1, except by using the charge transport monomer N-[(meth)acroyloxypropylphenyl]-N,N',N'-triphenyl-(1,1'-biphenyl)-4,4'-diamine (TPD acrylate).

Comparative Production Example 2

Preparation of Copolymer by Azo Initiator Polymerization of Charge Transport Monomer and Non-Linear-Optical Precursor Monomer (TPD Acrylate/Chromophore Type 10:1)

A photorefractive copolymer was obtained in the same manner as in the Production Example 1, except by using the charge transport monomer N-[(meth)acroyloxypropylphenyl]-N,N',N'-triphenyl-(1,1'-biphenyl)-4,4'-diamine (TPD acrylate) (2.5 g, 4.1 mmol) and the non-linear-optical precursor monomer 5-[N-ethyl-N-4-formylphenyl]amino-pentyl acrylate (0.25 g).

Comparative Production Example 3

Preparation of Copolymer by Azo Initiator Polymerization (CbZ Acrylate/Chromophore Type 10:1)

A photorefractive copolymer was obtained in the same manner as in the Production Example 1, except by using charge transport monomer N-[(meth)acroyloxypropylphenyl]-N,N'-diphenylamine (CBz acrylate) (5.0 g) and the non-linear-optical precursor monomer 5-[N-ethyl-N-4-formylphenyl]amino-pentyl acrylate (0.50 g).

Example 1

A photorefractive composition was prepared using the following photorefractive components:

(i) Photoconductive polymer (prepared in Production Example 2)-PA(TPD/ECz/DCST)    50 wt %

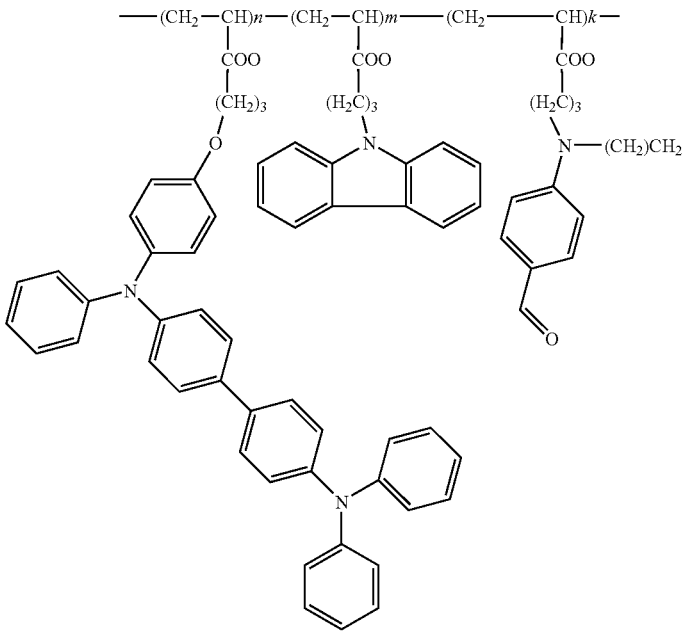

| | | |
|---|---|---|
| (ii) Non-linear electrooptic chromophore-F-DCST | 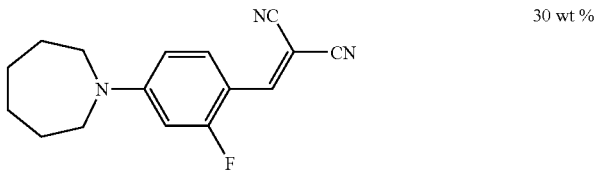 | 30 wt % |
| (iii) Plasticizer-ECZ | 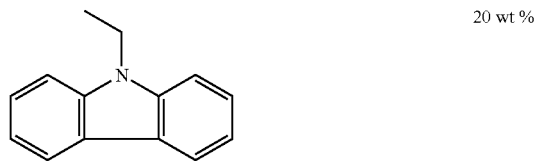 | 20 wt % | n/m/k = 5/5/1

The photorefractive composition was fabricated with a photoconductive copolymer PA (TPD/ECz/DCST), a chromophore F-DCST, and a plasticizer ECZ. To prepare the photorefractive composition, the components listed above were dissolved in 5 mL mixture of 1:1 toluene/dichloromethane (DCM) and stirred overnight at room temperature. The solution was filtrated using 0.2 μm PTFE filter and then the solvent was removed by rotary evaporation and vacuum drying at 50° C. The dried composite was gathered and further dried by placing it on a slide glass on a 150° C. hot plate. Small pellets of the dried composite were placed on two indium tin oxide (ITO)-coated glasses on the hot plate. A 104 μm glass spacer paste was then placed on the edges of the ITO glass. A second ITO glass was placed over the spacer paste to form uniformly thick photorefractive composition having good optical clarity.

The 8 kV external electric file required for the carrier photogeneration and transport was applied to the ITO electrodes of the photorefractive composition. The composition was characterized by performing degenerate four-wave mixing (DFEM) of 532 nm continuous wave (CW) laser. The photorefractive composition presented 73% initial diffraction efficiency and 55% grating holding ratio after 4 min.

Example 2

A photorefractive composition was prepared using the following photorefractive components:

| | | |
|---|---|---|
| (i) Photoconductive polymer (prepared in Production Example 3)-PA(TPD/ECz/DCST) | 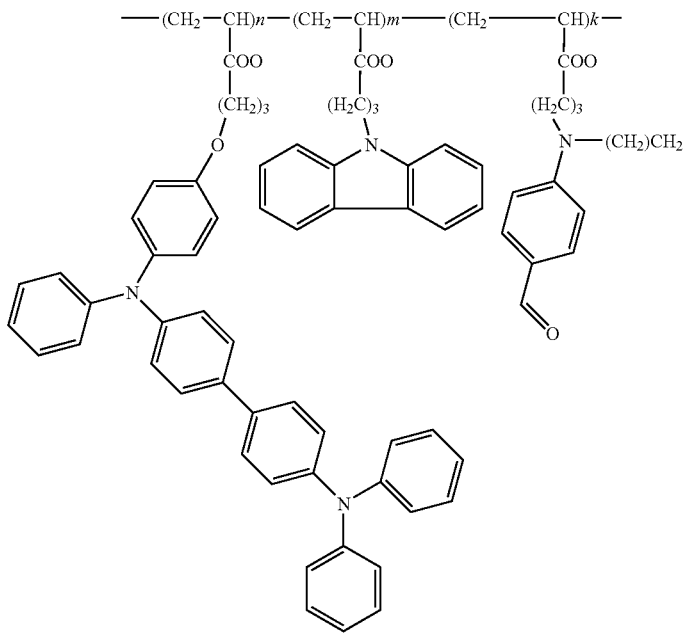 | 50 wt % |

| | -continued | |
|---|---|---|
| (ii) Non-linear electrooptic chromophore-F-DCST | 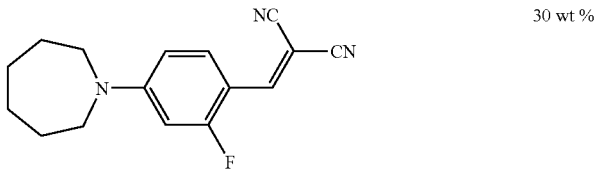 | 30 wt % |
| (iii) Plasticizer-ECZ | 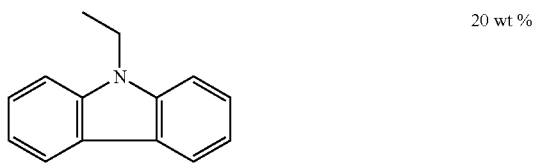 | 20 wt % | n/m/k = 7.5/2.5/1

The photorefractive composition was obtained in the same manner as in Example 1. The 8 kV external electric field required for the carrier photogeneration and transport was applied to the ITO electrodes of the photorefractive composition. The composition was characterized by performing DFEM of 532 nm CW laser. The photorefractive composition presented 70% initial diffraction efficiency and 23% grating holding ratio after 4 min.

Comparative Example 1

A photorefractive composition was obtained in the same manner as in Example 1, except a TPD homo-polymer having the following formula (prepared in Comparative Production Example 1) was used.

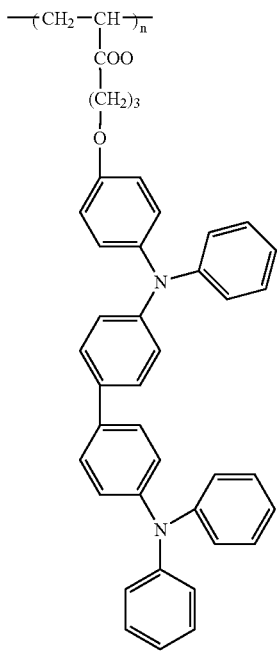

The photorefractive composition presented a fast response time of about 12 ms and a high initial diffraction efficiency of about 70%. However, the long grating ratio was too weak to be measures after 4 minutes. The initial grating was washed out so quickly due to the lack of grating holding nature.

Comparative Example 2

A photorefractive composition was obtained in the same manner as in Example 1, except the following copolymer (prepared in Comparative Production Example 2) was used:

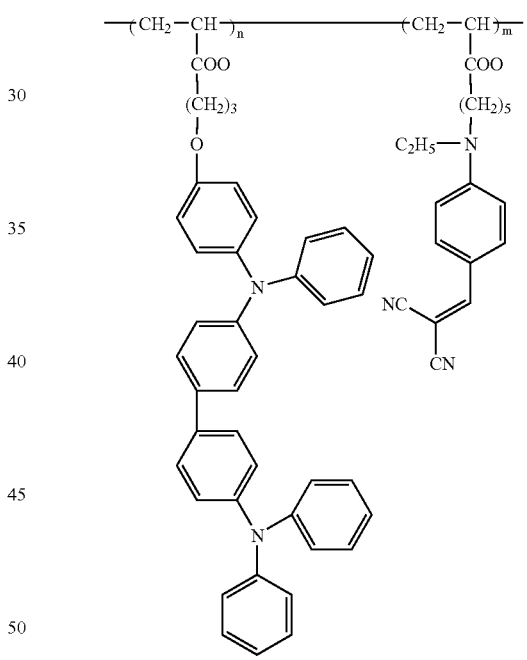

wherein the weight ratio of n:m is 10:1.

The photorefractive composition had a relatively good response time of about 47 ms and a high initial diffraction efficiency of about 65%. The photorefractive composition showed only 0.1 grating holding ratio after 4 minutes.

Comparative Example 3

A photorefractive composition was obtained in the same manner as in Example 1, except the following copolymer (prepared in Comparative Production Example 3) was used:

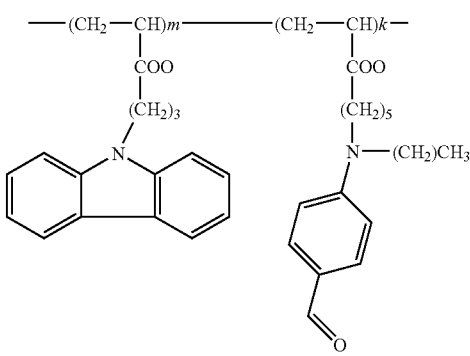

wherein the weight ratio of m:k is 10:1.

The copolymer was copolymerized with low photoconductive propyl-carbazole moiety and electro-optical moiety, resulting in a relatively slow response time of about 330 ms but a good initial diffraction efficiency of about 68%.

Although the invention has been described with reference to embodiments and examples, it should be appreciated by those skilled in the art that various omissions, additions and modifications may be made to the compositions and methods described above without departing from the scope of the invention, and all such modifications and changes are intended to fall within the scope of the invention. Accordingly, the invention is only limited by the following claims.

What is claimed is:

1. A non-linear optical device comprising a polymer configured to provide a grating holding ratio of 20% or higher after about four minutes, wherein the polymer comprises a first repeating unit comprising a first moiety having formula (M-1) and a second repeating unit comprising a second moiety having formula (M-2):

(M-1)

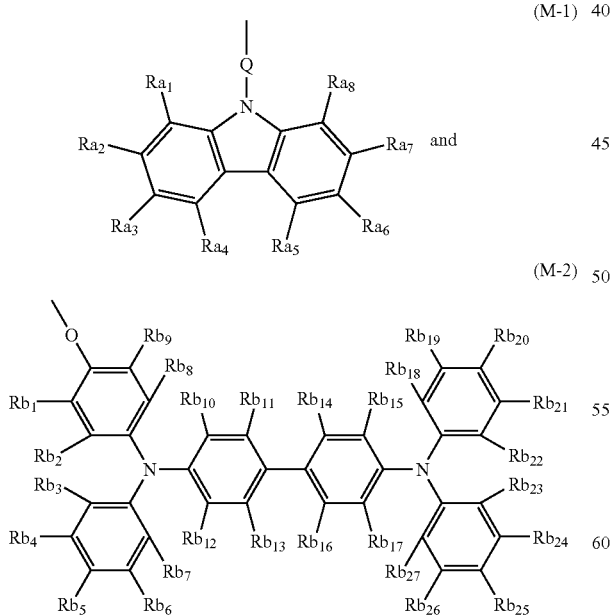

(M-2)

wherein each Q in (M-1) and (M-2) independently represents an unsubstituted or substituted alkylene group; and wherein $Ra_1$-$Ra_8$ and $Rb_1$-$Rb_{27}$ in (M-1) and (M-2) are each independently selected from the group consisting of hydrogen, $C_1$-$C_{10}$ alkyl, $C_4$-$C_{10}$ aryl and $C_4$-$C_{10}$ heteroaryl wherein the ratio of the first to second repeating units is in the range of about 1:10 to about 5:1.

2. The optical device of claim 1, wherein the polymer is further configured to provide an initial diffraction efficiency of 50% or higher.

3. The optical device of claim 1, wherein the polymer comprises a third repeating unit that includes a third moiety represented by the following formula:

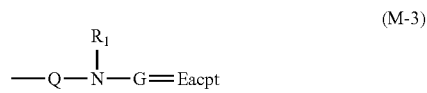

(M-3)

wherein $R_1$ in (M-3) is selected from the group consisting of hydrogen, $C_1$-$C_{10}$ alkyl, $C_4$-$C_{10}$ aryl and $C_4$-$C_{10}$ heteroaryl; Q in (M-3) independently represents an unsubstituted or substituted alkylene group; G in (M-3) is a π-conjugated group; and Eacpt in (M-3) is an electron acceptor group.

4. The optical device of claim 3, wherein "G=" in formula (M-3) is represented by a structure selected from the group consisting of the following formulas:

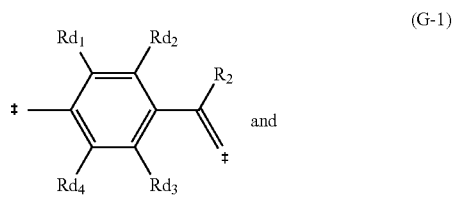

wherein $Rd_1$-$Rd_4$ and $R_2$ in (G-1) and (G-2) are each independently selected from the group consisting of hydrogen, $C_1$-$C_{10}$ alkyl, $C_4$-$C_{10}$ aryl and $C_4$-$C_{10}$ heteroaryl.

5. The optical device of claim 3, wherein Eacpt in formula (M-3) is represented by a structure selected from the group consisting of the following formulas:

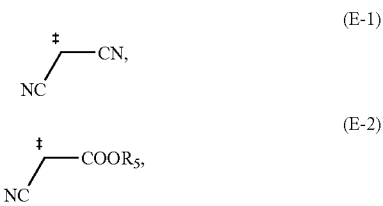

-continued

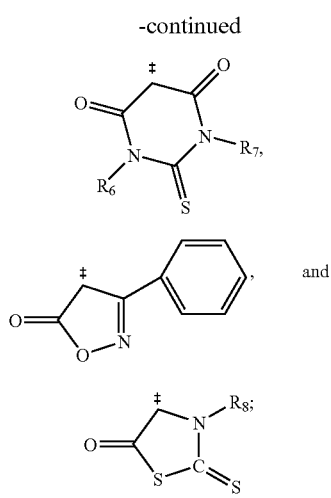

(E-3)

(E-4)

(E-5)

wherein $R_5$, $R_6$, $R_7$ and $R_8$ in (E-2), (E-3), and (E-5) are each independently selected from the group consisting of hydrogen, $C_1$-$C_{10}$ alkyl, $C_4$-$C_{10}$ aryl and $C_4$-$C_{10}$ heteroaryl.

6. The optical device of claim 1, wherein the first repeating unit is represented by the formula (U-1) and the second repeating unit is represented by the formula (U-2):

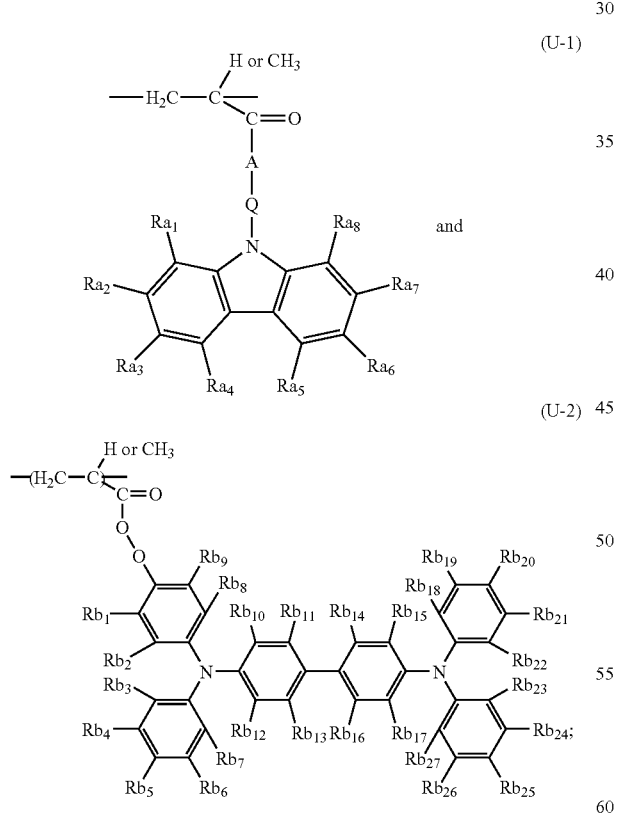

(U-1)

and (U-2)

wherein each Q in (U-1) and (U-2) independently represents an unsubstituted or substituted alkylene group; and wherein $Ra_1$-$Ra_8$ and $Rb_1$-$Rb_{27}$ in (U-1) and (U-2) are each independently selected from the group consisting of hydrogen, $C_1$-$C_{10}$ alkyl, $C_4$-$C_{10}$ aryl and $C_4$-$C_{10}$ heteroaryl.

7. The optical device of claim 6, wherein the polymer further comprises a third repeating unit represented by the following formula:

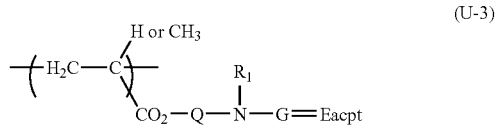

(U-3)

wherein Q in (U-3) independently represents an unsubstituted or substituted alkylene group; $R_1$ (in U-3) is selected from the group consisting of hydrogen, $C_1$-$C_{10}$ alkyl, $C_4$-$C_{10}$ aryl and $C_4$-$C_{10}$ heteroaryl; G in (U-3) is a π-conjugated group; and Eacpt in (U-3) is an electron acceptor group.

8. The optical device of claim 7, wherein "G=" in formula (U-3) is represented by a structure selected from the group consisting of the following formulae:

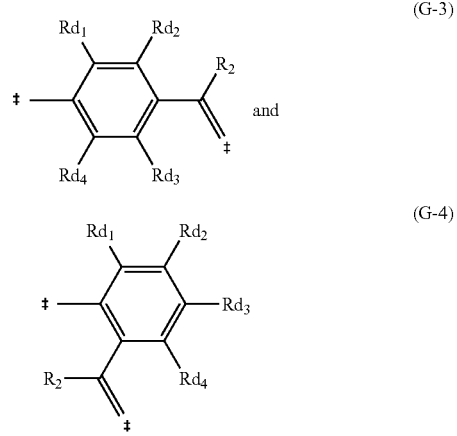

(G-3)

and (G-4)

wherein $Rd_1$-$Rd_4$ and $R_2$ in (G-3) and (G-4) are each independently selected from the group consisting of hydrogen, $C_1$-$C_{10}$ alkyl, $C_4$-$C_{10}$ aryl and $C_4$-$C_{10}$ heteroaryl.

9. The optical device of claim 7, wherein Eacpt in formula (U-3) is represented by a structure selected from the group consisting of the following formulas:

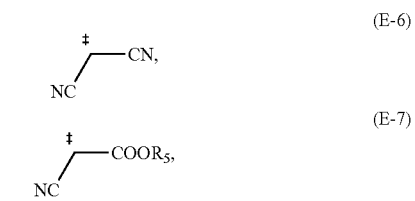

(E-6)

(E-7)

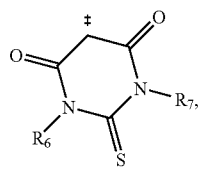

(E-8)

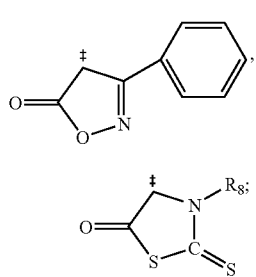

wherein $R_5$, $R_6$, $R_7$ and $R_8$ in (E-7), (E-8), and (E-10) are each independently selected from the group consisting of hydrogen, $C_1$-$C_{10}$ alkyl, $C_4$-$C_{10}$ aryl and $C_4$-$C_{10}$ heteroaryl.

10. The optical device of claim 1, further comprising a plasticizer and/or sensitizer.

11. The optical device of claim 1, wherein the polymer is configured to provide photorefractivity upon irradiation by a green laser.

12. The optical device of claim 1, wherein the polymer is configured to provide photorefractivity upon irradiation by a green laser that is a continuous wave laser or a pulse laser.

* * * * *